(12) United States Patent
Epstein et al.

(10) Patent No.: US 8,074,581 B2
(45) Date of Patent: Dec. 13, 2011

(54) CONFERENCE TABLE ASSEMBLY

(75) Inventors: Lewis Mark Epstein, San Mateo, CA (US); Kyle J. Doerksen, Palo Alto, CA (US); Matthew Robert Adams, Mountain View, CA (US); Larry Cheng, Palo Alto, CA (US); Brian Joseph Mason, Menlo Park, CA (US); Thomas Overthun, San Francisco, CA (US); Todd Allen Pelman, San Francisco, CA (US); Vivek Mohan Rao, San Francisco, CA (US); David John Rinaldis, Redwood City, CA (US); Lukas Martin Scherrer, San Francisco, CA (US); Mark D. Siminoff, Mountain View, CA (US); Susanne Stage, San Francisco, CA (US); Joerg Christoph Student, San Francisco, CA (US); James Nolan Ludwig, Grand Rapids, MI (US); Brett Robert Kincaid, Ada, MI (US)

(73) Assignee: Steelcase Inc., Grand Rapids, MI (US)

( * ) Notice: Subject to any disclaimer, the term of this patent is extended or adjusted under 35 U.S.C. 154(b) by 556 days.

(21) Appl. No.: 12/250,192

(22) Filed: Oct. 13, 2008

(65) Prior Publication Data

US 2009/0260547 A1 Oct. 22, 2009

Related U.S. Application Data

(60) Provisional application No. 60/979,668, filed on Oct. 12, 2007.

(51) Int. Cl.
*A47B 37/00* (2006.01)

(52) U.S. Cl. .............. 108/50.01; 108/50.02; 312/223.3

(58) Field of Classification Search ............. 108/50.01, 108/50.02, 64, 23; 312/223.6, 223.3, 223.1; 709/204; 348/15; 361/379.02, 679.05, 379.22, 361/379.23, 679.6
See application file for complete search history.

(56) References Cited

U.S. PATENT DOCUMENTS

| | | |
|---|---|---|
| 1,428,629 A | 9/1922 | Gunn |
| D100,987 S | 8/1936 | Colen |
| D142,121 S | 8/1945 | Ristenpart |

(Continued)

OTHER PUBLICATIONS

Polycom RealPrescence Experience (RPX) User Guide, Feb. 2007 Edition, Version 1.0, 3 pages.

(Continued)

*Primary Examiner* — Jose V Chen
(74) *Attorney, Agent, or Firm* — Quarles & Brady LLP

(57) ABSTRACT

A conferencing assembly for use with at least one computer, the assembly including a table top forming a table top opening, a leg support structure, a display screen supported adjacent the top surface, a switcher for controlling input to the display screen, a plurality of handsets, each hand set including a selector button usable to send a signal to the switcher thereby causing the switcher to link a computer associated with the selector button to the display, a plurality of handset cables, each handset cable having first and second ends linked to the switcher and an associated selector button, respectively, for passing signals from the selector buttons to the switcher, a take up assembly including a separate weight for each of the handset cables, the take up assembly disposed below the top member and aligned with the top opening, each handset cable linked to an associated weight, each weight applying a force tending to pull the second end of the associated handset cable into the opening.

24 Claims, 29 Drawing Sheets

U.S. PATENT DOCUMENTS

| | | | |
|---|---|---|---|
| D158,160 S | 4/1950 | Viola | |
| D158,522 S | 5/1950 | Smith et al. | |
| 3,128,344 A * | 4/1964 | Goold | 108/50.02 |
| 3,177,594 A * | 4/1965 | Demo | 434/320 |
| D209,841 S | 1/1968 | Bue et al. | |
| D209,911 S | 1/1968 | Cooper | |
| 3,549,200 A | 12/1970 | Cooper | |
| D245,465 S | 8/1977 | Hindle | |
| 4,050,165 A * | 9/1977 | Yamauchi et al. | 434/320 |
| 4,155,609 A | 5/1979 | Skafte et al. | |
| 4,323,291 A | 4/1982 | Ball | |
| 4,382,643 A | 5/1983 | Heinrich | |
| 4,516,156 A | 5/1985 | Fabris et al. | |
| 4,612,863 A | 9/1986 | Vonhausen et al. | |
| D293,403 S | 12/1987 | Umanoff et al. | |
| 4,735,467 A * | 4/1988 | Wolters | 312/223.3 |
| 4,838,177 A | 6/1989 | Vander Park | |
| 4,852,500 A | 8/1989 | Ryburg et al. | |
| 4,996,110 A | 2/1991 | Tanuma et al. | |
| 5,035,392 A | 7/1991 | Gross et al. | |
| 5,065,832 A * | 11/1991 | Mark | 108/50.02 |
| 5,104,087 A | 4/1992 | Wentzloff et al. | |
| 5,121,698 A * | 6/1992 | Kelley | 108/50.02 |
| 5,122,941 A | 6/1992 | Gross et al. | |
| 5,131,849 A | 7/1992 | Perrero | |
| 5,261,735 A | 11/1993 | Cohen et al. | |
| 5,328,145 A | 7/1994 | Charapich | |
| 5,351,241 A * | 9/1994 | Yehonatan | 370/446 |
| 5,352,033 A | 10/1994 | Gresham et al. | |
| 5,438,937 A | 8/1995 | Ball et al. | |
| D367,857 S | 3/1996 | Emmerik | |
| 5,503,891 A | 4/1996 | Marshall et al. | |
| 5,549,267 A | 8/1996 | Armbruster et al. | |
| 5,638,758 A | 6/1997 | Carr | |
| 5,655,822 A * | 8/1997 | Roberts et al. | 108/50.01 |
| 5,701,981 A * | 12/1997 | Marshall et al. | 191/12.4 |
| 5,765,315 A * | 6/1998 | Nagamitsu et al. | 108/50.01 |
| 5,797,666 A * | 8/1998 | Park | 312/223.3 |
| 5,831,211 A * | 11/1998 | Gartung et al. | 174/498 |
| 5,988,076 A | 11/1999 | Vander Park | |
| D435,361 S | 12/2000 | Goza | |
| 6,160,573 A | 12/2000 | Allen et al. | |
| 6,168,127 B1 | 1/2001 | Saylor et al. | |
| 6,189,268 B1 | 2/2001 | Carr et al. | |
| D463,439 S | 9/2002 | Olivo | |
| 6,443,415 B1 | 9/2002 | Sundblad | |
| 6,725,784 B2 * | 4/2004 | Crinion | 108/50.01 |
| 6,780,047 B1 * | 8/2004 | Laity et al. | 439/501 |
| 6,791,575 B2 | 9/2004 | Abboud | |
| 6,848,741 B2 | 2/2005 | Ford et al. | |
| 6,892,650 B2 | 5/2005 | Baloga et al. | |
| 6,931,795 B1 | 8/2005 | Baloga et al. | |
| D509,221 S | 9/2005 | Suber et al. | |
| 7,016,935 B2 | 3/2006 | Lee et al. | |
| 7,032,523 B2 | 4/2006 | Forslund, III et al. | |
| 7,125,088 B2 | 10/2006 | Haberman | |
| 7,207,278 B2 * | 4/2007 | Latino et al. | 108/50.01 |
| 7,317,446 B1 * | 1/2008 | Murphy | 345/163 |
| 7,922,267 B2 * | 4/2011 | Gevaert | 108/50.01 |
| 2006/0000955 A1 * | 1/2006 | Cvek | 248/161 |

OTHER PUBLICATIONS

Elecom, DTS-TS8 (Japanese), 2 pages.
Coeno-Storyboard: An Augmented Surface for Storyboard Presentations; (c) 2005, Medientechnik und—design.
Furniture Products-Brunswick Bowling, Jul. 2, 2007, 4 pages.
Administrator's Guide for the VSX Series, Version 8.5.3, Feb. 2007 Edition.

* cited by examiner

CONFERENCE TABLE ASSEMBLY

CROSS-REFERENCE TO RELATED APPLICATIONS

This application is based on and claims priority to U.S. Provisional Patent Application Ser. No. 60/979,668 filed on Oct. 12, 2007 and entitled "Conference Table Assembly."

STATEMENT REGARDING FEDERALLY SPONSORED RESEARCH OR DEVELOPMENT

Not applicable.

BACKGROUND OF THE INVENTION

The present invention relates to conferencing furniture and more specifically to conferencing tables for use with one or more display screens where multiple conference attendees can provide content for driving images presented via the display screen(s).

Small group (e.g., up to 8 attendees) conference tables have been designed that include one or more large display screens adjacent a table top edge or wall mounted or ceiling hung display or projection screens offset a distance from a table top edge. Here, the idea has been to provide information at or near a table edge for attendees to refer to during discussions and presentations. In many cases attendees use laptops or other digital information sources to drive the information presented via the display. To enable laptops to be powered and to access network data, power and data receptacles are often provided within conference tables (e.g., below grommet doors or covers that are flush with the top surface of a table top). A laptop user typically uses her own power and data cables to link to the receptacles. In addition, conference rooms are often equipped with audio and video cables to link a laptop to a display or to a projector for controlling presented information.

In many cases it is desirable to allow several attendees to control displayed information at different times during a conference. One way to allow several attendees to present information via a display is to sequentially have each presenter link to the display or projector via the audio and video cables. Here, transitions between presenters take time and are extremely disruptive.

One other way to allow several attendees to present is to provide separate audio and video cables for each presenter and a switcher device that enables each of the attendees to take control of the display screen via selection of a button associated with the presenters audio and video cables. One such switcher/cable/button assembly of this type is the DTS-TS8 switcher assembly by Elecom that provides eight separate audio/video cable assemblies and eight associated buttons along with a switcher that has eight input ports and one screen output port.

While a switcher and associated cables enable relatively quick transitions between presenters, these solutions typically require a large number of cables to be strewn across the top surface of a conference table. To this end, in addition to audio and video cables, power and data cables are often disposed on the top surface of the conference table and the garble of cables is unsightly and impedes use of the table top for other purposes (e.g., laying out of papers, etc.).

In addition, because the source selection buttons and associated audio and video cables are needed to interface with the switcher, these cables are typically kept with the switcher. For instance, where a switcher is to be used in a specific conference room, the audio/video/control cables (e.g., eight) are typically kept in the specific conference room and usually will be left linked to the switcher device for subsequent use. Thus, when audio/video/control cables are not being used (e.g., after a conference has been completed), the cables often remain strewn across a table top and the overall scene is unsightly.

Some conference table power and data/communication cable management solutions have been developed. To this end, cable systems have been developed that include spring loaded cable dispensers for dispensing network communication types cables (e.g., CAT-5 cables) for use at a conference table. Here, a dispenser housing is provided that mounts to the top surface of a table top or the like and a plurality (e.g., 8) of cable dispensers are mounted within the housing. One end of each cable can be pulled against the force or the spring out of each dispenser and plugged into a laptop. When a cable is not in use, the cable can be retracted via the spring force back into the dispenser and housing. While this solution works well for relatively thin communication type cables, this solution has several shortcomings. First, because the dispenser housing is located on top of the table top, the housing is always observable and reduces the elegance of an associated conference table and space. Second, where larger diameter cables such as audio and video cables are used, a simple spring loaded dispenser may need to be relatively large and the spring force would have to be relatively high to accomplish the retracting activity and therefore the overall size of the dispensing system would have to be increased appreciably. Thus, a spring loaded table top mounted dispensing system is not practical for many applications and, at best, solves the data cable management problem in a relatively unsightly manner.

In addition, conference tables are known that include power and data receptacles mounted below a table top member where the top member forms openings for passing cables for receptacle hookup and where cable receiving and retaining cavities have been formed adjacent the receptacles for receiving and storing excess power and data cable lengths. Thus, for instance, where a data cable is ten feet long but a laptop is positioned on a table top surface three feet from a data port/receptacle, the seven additional feet of cable can be tucked away in the cable receiving cavity under the top member.

After a conference has been completed, power and data cables often are removed from the conference space. To this end, currently most laptop computers come with their own power and data cables and therefore attendees plug in to receptacles using their own power and data cables which are removed after use. Thus, in most cases power and data cables do not pose an aesthetic problem when a conference is not being conducted within a conference space.

Thus, while solutions for managing power and data cables have been developed, similar solutions have not been developed for audio/video/control cables that form part of a switcher system and that typically remain within a conference space along with a switcher device after a conference has been completed.

BRIEF SUMMARY OF THE INVENTION

It has been recognized that a storage space can be provided below a table top opening for receiving control cables when the cables are not in use or to receive portions of control cables that are not in use. It has also been recognized that a weight of some type can be linked to each of the control cables below the top surface where the weight tends to pull the cable into the space below the table top to aid a cable user in moving the cable back into the space when not in use. Moreover, it has been recognized that the weight can substantially automatically take up any slack in a control cable between a handset that includes a control button and the table top opening so that excess cable is removed from the table top surface.

The handset can be constructed to be relatively heavy so that the handset can be placed on the table top surface and remain in its disposed position despite the weight tending to pull the handset and cable back into the storage space. Also, to this end, the handset may include rubber or tacky plastic strips or foot members on an undersurface to help maintain the position of the handset after placement on a work surface or the like. Moreover, the handset may include rubber strips or the like on a side or circumferential surface to help retain the handset in a receiving cavity during storage. The handset may, in some cases, include audio and/or video jacks that can be linked to a laptop computer or the like. Here, the handset weight serves the additional purpose of reducing force applied to laptop audio and video jacks. In at least some cases a deck member may be provided in the space below the table top member and on which the handsets can be placed and supported when not in use and door members may be provided to substantially cover (e.g., leave a slot open along one or more edges for cables to pass through) the opening when desired.

Consistent with the above, at least some at least some embodiments of the invention include a conferencing assembly for use with at least one computer, the assembly comprising a table top member having top and bottom surfaces and forming a table top opening, a leg support structure supporting the top member is a substantially horizontal orientation, a display screen associated with the top member and supported adjacent the top surface, a switcher for controlling input to the display screen, a plurality of handsets, each hand set including a selector button usable to send a signal to the switcher thereby causing the switcher to link a computer associated with the selector button to the display, a plurality of handset cables, each handset cable having first and second ends linked to the switcher and an associated selector button, respectively, for passing signals from the selector buttons to the switcher, a take up assembly including a separate weight for each of the handset cables, the take up assembly disposed below the top member and aligned with the table top opening, each handset cable linked to an associated weight, each weight applying a force tending to pull the second end of the associated handset cable into the opening.

In at least some cases each weight includes a pulley wheel, each handset cable passing around an associated pulley wheel. In at least some cases each weight further includes first and second plates mounted on opposite sides of the pulley wheel. In at least some cases the plates are mounted to the pulley wheel axis via a pin.

In at least some cases the assembly further includes a guide structure, the guide structure forming a separate substantially vertical channel for each of the pulley wheels, each pulley wheel moving up and down within a channel as the second end of an associated cable is pulled away from and allowed to move toward the opening, respectively. In at least some cases the assembly includes at least four separate handsets. In at least some cases the take up assembly further includes a deck member having a top deck surface below the top surface of the table top member, the deck member forming a separate opening for each of the handsets, each cable passing through a separate one of the openings formed by the deck member, the handsets received on the deck surface of the deck member thereby limiting downward movement through the opening formed by the deck member.

In at least some cases the deck surface forms a recess proximate each of the openings formed by the deck member, each recess formed to receive an associated one of the handsets. In at least some cases the deck surface is substantially parallel to the top surface of the table top member. In at least some cases the assembly further includes at least one utility wall member extending upward from the deck surface below the table top member and at least one of a power and a data receptacle mounted in the wall member for access through the table top opening.

In at least some cases the assembly further includes a utility island extending upward from the deck surface, the utility wall forming a circumferential wall about the island, the island further including a top mounting surface that is substantially parallel to the top surface of the table top member. In at least some cases the island includes at least first, second, third and fourth receptacles, the first and second receptacles facing in substantially opposite directions and the third and fourth receptacles facing in substantially opposite directions. In at least some cases the assembly further includes first and second door members hingedly mounted to the mounting surface for movement between open and closed positions, each door member including a top door surface, when the door members are in the closed positions, the door members substantially closing the table top opening and the door surfaces substantially flush with the top surface of the table top member. In at least some cases an opening edge defines the shape of the table top opening, the door members forming a gap with the opening edge when in the closed positions.

In at least some cases the deck member has a circumferential edge, the assembly further including a well wall member extending upward from the circumferential edge of the deck member to the bottom of the table top member so that the deck and the well wall member form a cavity below the table top member for receiving cables and the like. In at least some cases each handset cable further includes a video cable and each handset further includes a video jack proximate the button for linking to an associated computer.

In at least some cases each handset cable further includes an audio cable and each handset further includes an audio jack proximate the button for linking to an associated computer. In at least some cases each handset weighs at least one pound.

Some embodiments include a conferencing assembly for use with at least one computer, the assembly comprising a table top member having top and bottom surfaces and forming a table top opening, a leg support structure supporting the top member is a substantially horizontal orientation, a display screen associated with the top member and supported adjacent the top surface, a switcher for controlling input to the display screen, a plurality of handsets, each hand set including a selector button usable to send a signal to the switcher thereby causing the switcher to link a computer associated with the selector button to the display, a plurality of handset cables, each handset cable having first and second ends linked to the switcher and an associated selector button, respectively, for passing signals from the selector buttons to the switcher, a deck member having a top deck surface below the top surface of the table top member and aligned with the table top opening, the deck member forming a separate opening for each of the handsets, each handset cable passing through a separate one of the openings formed by the deck member, the handsets received on the deck surface of the deck member thereby limiting downward movement through the openings formed by the deck member and a take up assembly including a separate pulley wheel for each of the handset cables, the take up assembly disposed below the deck member, each handset cable linked to an associated pulley wheel, each pulley wheel applying a force tending to pull the second end of the associated handset cable toward the deck top.

In some embodiments the leg support structure form a leg cavity, the deck member and take up assembly disposed within the leg cavity. In some embodiments the switcher is also disposed within the leg cavity. Some embodiments further include a totem assembly and a bridge member, the totem assembly having top and bottom ends and a mounting surface, the totem disposed adjacent the top member with the mounting surface above the top surface of the table top member, the bridge member having first and second ends secured to the leg support structure and the totem assembly, respectively, the display screen mounted to the mounting surface adjacent the top surface of the table top member.

Other embodiments include a conferencing assembly for use with at least one computer, the assembly comprising a table top member having top and bottom surfaces and forming a table top opening, a leg support structure supporting the top member is a substantially horizontal orientation, a display screen associated with the top member and supported adjacent the top surface, a switcher for controlling input to the display screen, a plurality of handsets, each hand set including a selector button usable to send a signal to the switcher thereby causing the switcher to link a computer associated with the selector button to the display, a plurality of handset cables, each handset cable having first and second ends linked to the switcher and an associated selector button, respectively, for passing signals from the selector buttons to the switcher and a deck member having a top deck surface below the top surface of the table top member and aligned with the table top opening, the deck member forming a separate opening for each of the handsets, each handset cable passing through a separate one of the openings formed by the deck member, the handsets received on the deck surface of the deck member thereby limiting downward movement through the openings formed by the deck member.

Some cases further include a take up assembly including a separate weight for each of the handset cables, the take up assembly disposed below the deck member, each handset cable linked to an associated weight, each weight applying a force tending to pull the second end of the associated handset cable toward the deck top.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 14:
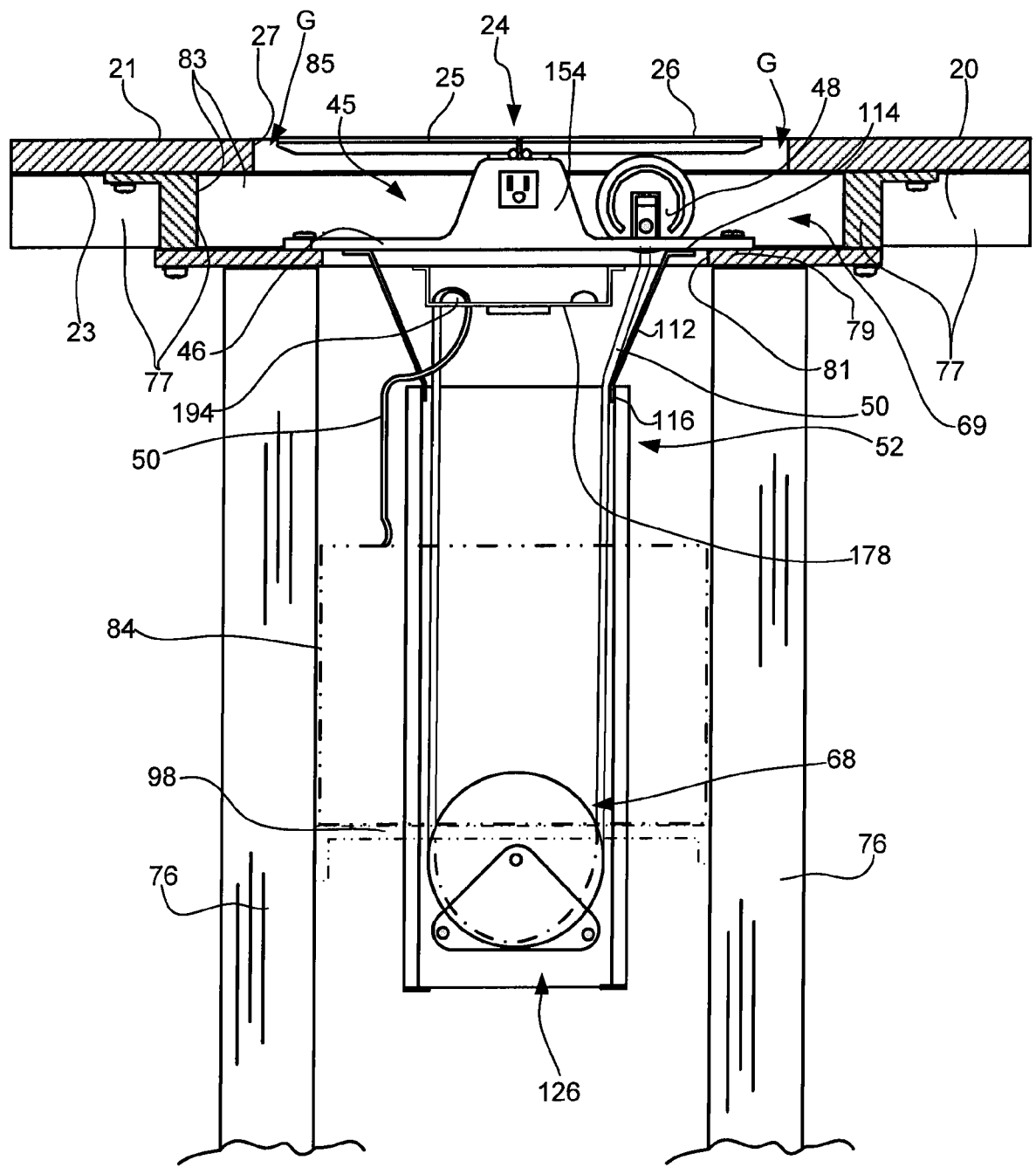
FIG. 14 is a partial cross sectional view showing the wire management assembly installed in a leg cavity with a single handset in a stowed position.

Referring now to the drawings wherein like reference numerals correspond to similar elements throughout the several views and, more specifically, referring to FIGS. 1-6, the present invention will be described in the context of an exemplary conferencing table configuration or assembly 10 including a table assembly 12, a totem/display assembly 14 and a bridge assembly 16. Table assembly 12 includes a leg support structure 18, a table top member 20 and wire management assembly 24. Referring also to FIGS. 6 and 14, leg support structure 18 includes vertical leg members 76, horizontal foot members 80, a foot rail 22, horizontal shoulder members 77 and a top plate 79. In at least some embodiments, four vertical leg members 76 are provided (only two illustrated) and the leg members are spaced apart to form a rectilinear leg cavity 82.

Four foot members 80 extend from the vertical leg members 76 or other leg structural components (e.g., horizontal members that extend between bottom ends of the vertical leg members 76) in four opposite directions that provide stability to the leg members 76 and other assembly components thereabove. Foot rail 22 is mounted to the top ends of vertical standoffs (not labeled) that extend up from distal ends of the foot members 80 and, in the illustrated embodiment, forms a generally square shaped foot rest that circumscribes and is spaced apart from the vertical leg members 76.

The top plate 79 is a rigid rectilinear member that forms a square plate opening 81 (see FIG. 14 specifically). Top plate 79 is mounted via welding or mechanical fasteners to the top ends of vertical leg member 76 opposite foot members 80 with the plate opening 81 aligned with leg cavity 82 there below. Although not illustrated or separately labeled, top plate 79 forms a plurality of screw holes for passing screws used to mount other assembly components thereto. Screws are used to secure shoulder members 77 to a top surface 85 of top plate 79. Once shoulder members 77 are secured to top plate 79, internal surfaces 83 of shoulder members 77 and the top surface 85 of top plate 79 form a separate well or cavity 69 (see FIG. 14) that resides generally above leg cavity 82.

In at least some embodiments, leg housing member 30 is a three-sided leg structure that can be slid over and mechanically fasten to the vertical leg members 76 to enclose the leg channel 82.

Referring once again to FIGS. 1-5, table top member 20 is a rectilinear, planar and rigid member having top and bottom surfaces 21 and 23, respectively. Referring also to FIG. 14, top member 20 forms a central substantially rectilinear opening 27.

Figure 5:
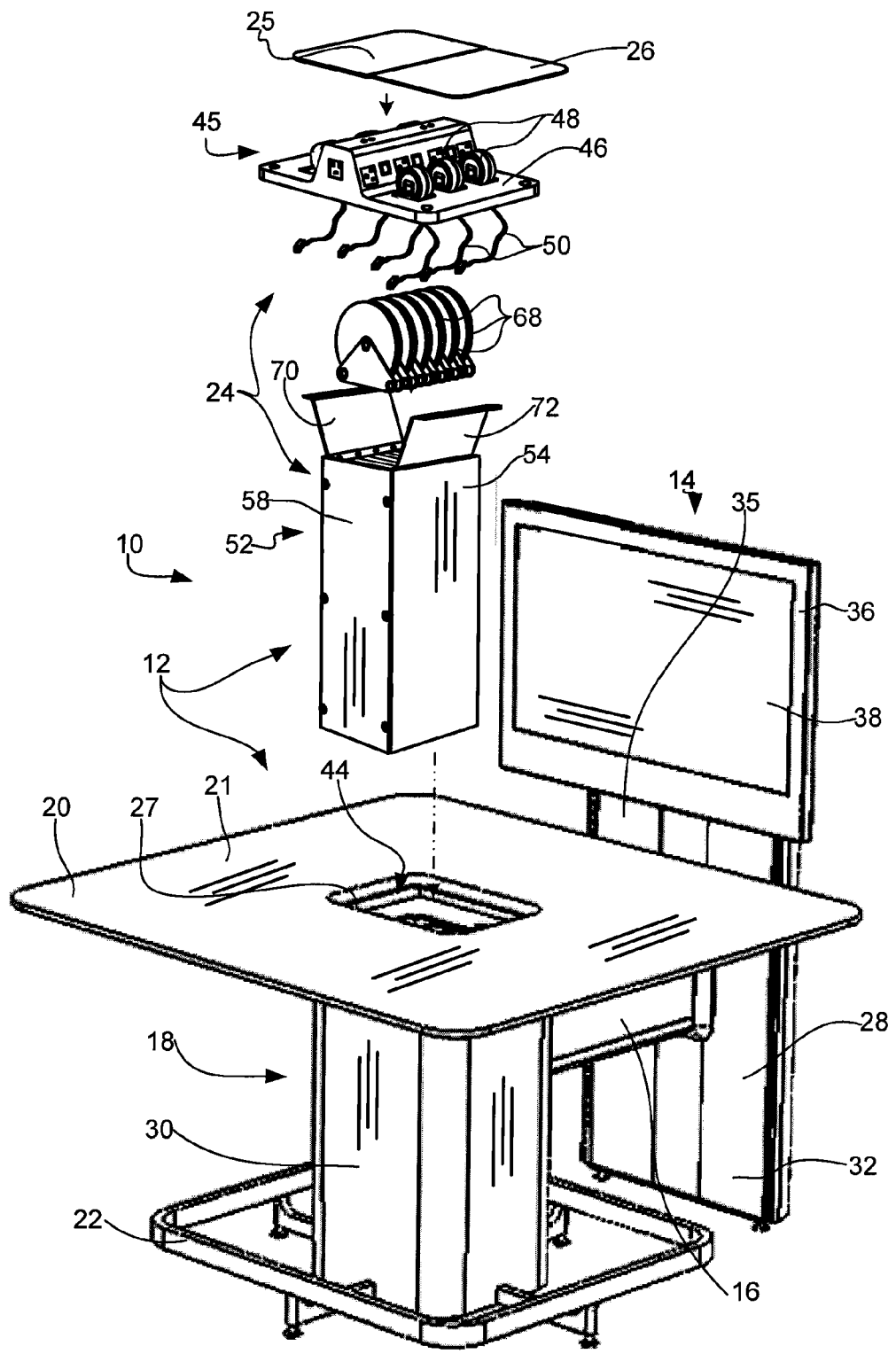
FIG. 5 is a partially exploded perspective view of the conference table assembly of FIG. 1.
Figure 6:
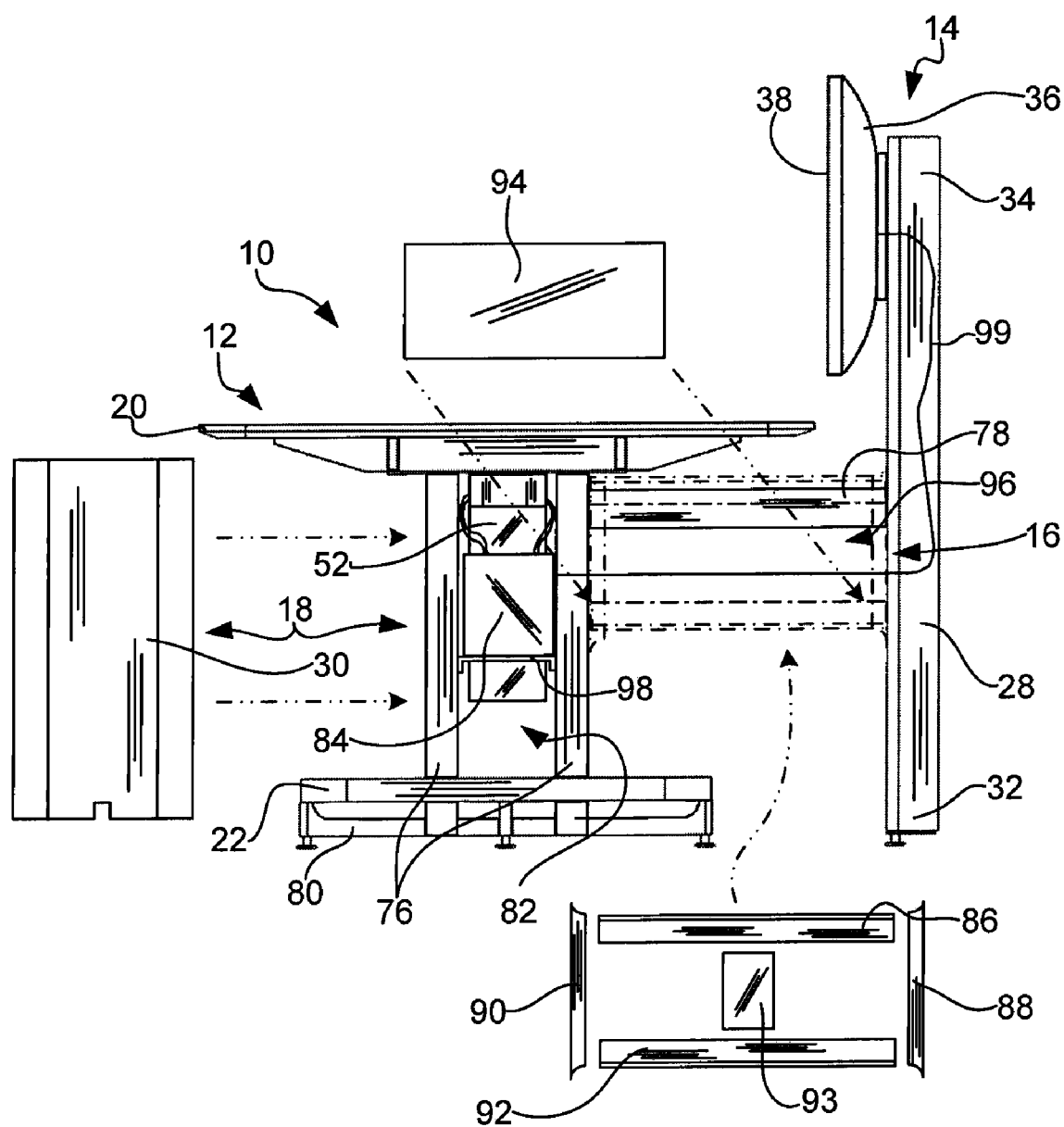
FIG. 6 is a partially exploded side plan view of the conferencing table of FIG. 1.
Figure 7:
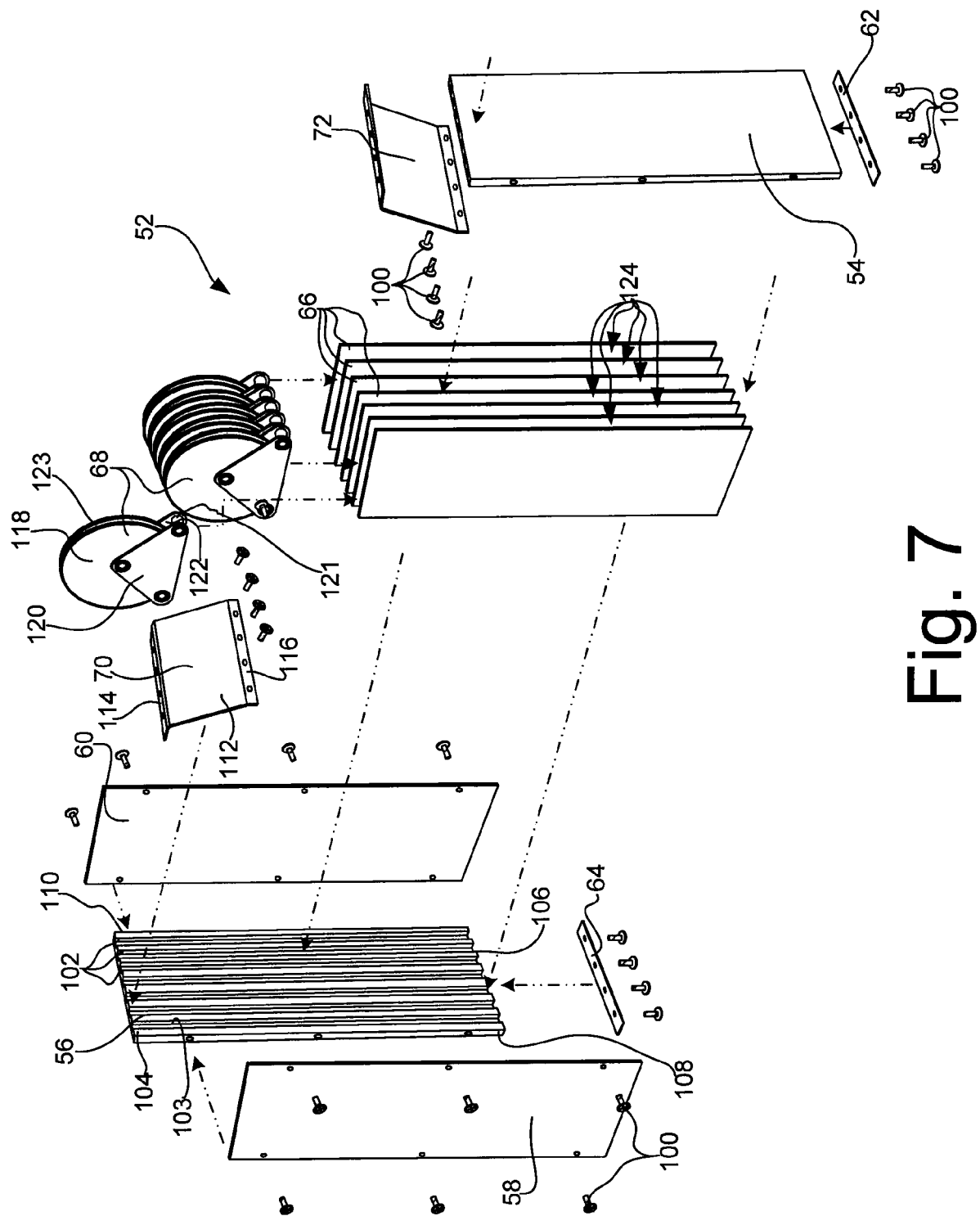
FIG. 7 is an exploded view of the retractor assembly shown in FIG. 5.
Figure 8:
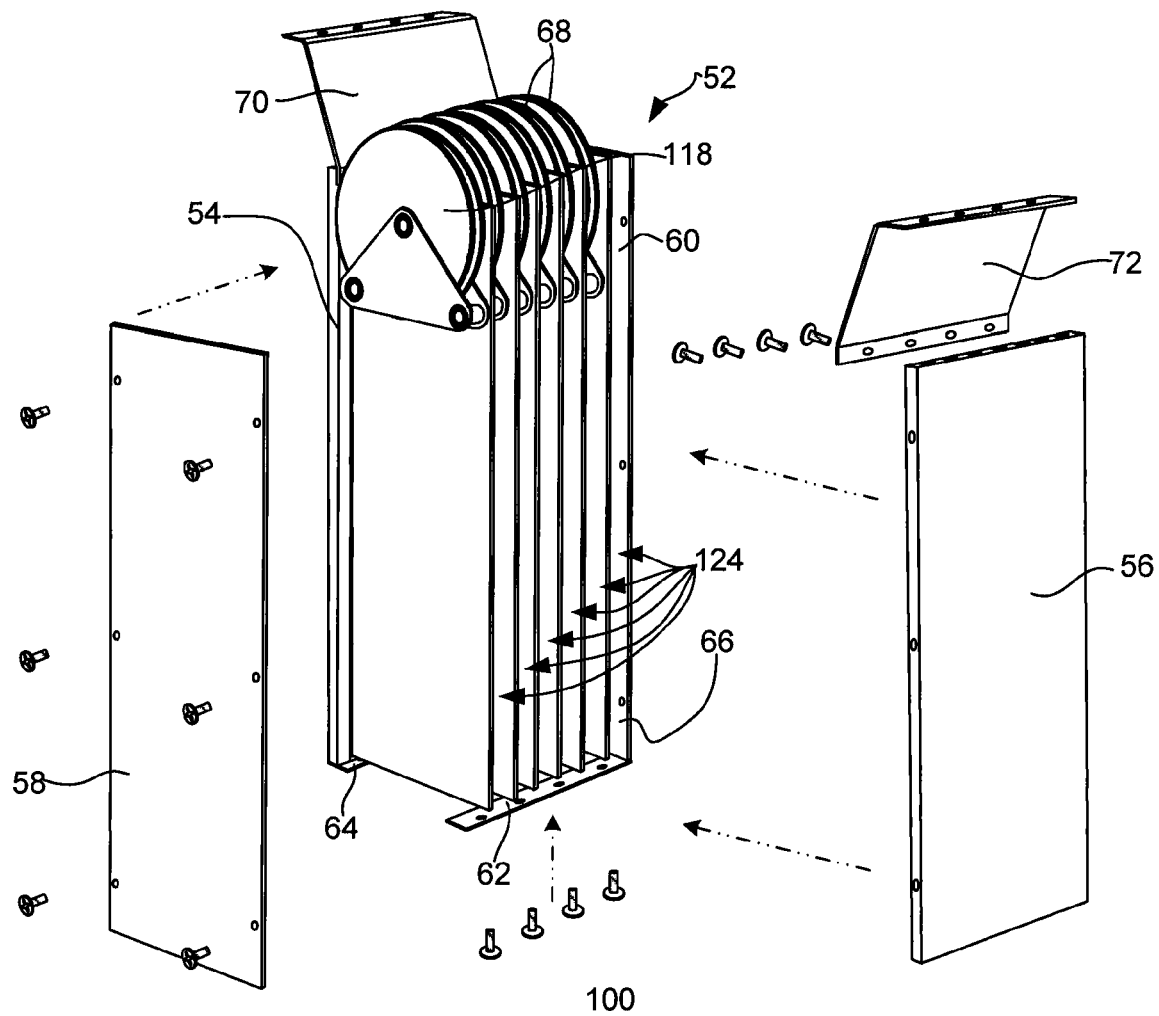
FIG. 8 is a partially exploded view of the retractor assembly of FIG. 7.

Referring now to FIG. 5, wire management assembly 24 includes first and second door or cover members 25 and 26, respectively, a deck assembly 45 and a retractor assembly 52. Referring also to FIGS. 7, 8 and 14, retractor assembly 52 includes a first slotted wall member 54, a second slotted wall member 56, a first end wall member 58, a second end wall member 60, a first bottom plate or bracket 62, a second bottom plate or bracket 64, seven separate divider members collectively identified by numeral 66, six separate pulley/weight assembly collectively identified by numeral 68, a first sloped mounting bracket 70, a second sloped mounting bracket 72 and a plurality of screws for securing the retractor assembly components together, at least a subset of the screws collectively identified by numeral 100. The first and second slotted wall members 54 and 56 are similarly constructed and operate in a similar fashion and therefore, in the interest of simplifying this explanation, only the second slotted wall member 56 which is best shown in FIG. 7 will be shown here in detail. Slotted wall member 56 is generally a rigid rectilinear member including an external surface (not labeled) and an oppositely facing internal surface 103 as well as top and bottom ends 104 and 106, respectively, and first and second lateral edges 108 and 110, respectively. As the label implies, member 56 forms a plurality of slots collectively identified by numeral 102 in internal surface 103. Each slot 102 is a straight slot that extends from the top end 104 to the bottom end 106 of member 56 and all of the slots 102 are parallel to a length dimension of member 56. In addition, member 56 forms threaded openings along each of the top, bottom, first lateral and second lateral edges for receiving shafts of screws to facilitate fastening of other retractor assembly components.

Referring still to FIGS. 7 and 8, each of the first and second end wall members 58 and 60 is similarly constructed and operates in a similar fashion and therefore, only end wall 58 will be described in any detail. Wall member 58 is a flat, rigid and rectilinear member that forms mounting openings (not labeled) along first and second lateral edges. The mounting openings formed by member 58 align with the threaded shaft receiving openings formed in first lateral edge 108 of member 56 when wall member 58 is placed adjacent edge 108.

Referring yet again to FIGS. 7 and 8, first bottom plate or bracket 62 is an elongated flat and rigid bracket that has a length dimension substantially equal to a width dimension of slotted wall member 56 between the lateral edges 108 and 110 of member 56 and forms openings for passing screws for attaching member 64 to bottom edge 106 of member 56. Similarly, second bracket 62 is a rectilinear rigid bracket having a length dimension equal to a width dimension of first slotted wall member 54.

Divider members 66 are rigid rectilinear members that each have thickness dimension substantially equal to a width dimension of one of the slots 102 formed by member 56 so that a lateral edge of each divider member 66 is receivable within one of the slots 102. Divider members 66 have length dimensions substantially equal to a length dimension of slotted wall member 56 and have a width dimension such that, when retractor assembly 52 is assembled, each divider member 66 traverses the distance between slotted wall member 54 and 56 with lateral edges of each of members 66 received in oppositely facing slots formed by slotted wall members 54 and 56. Each divider member, in at least some embodiments, may be formed as a thin Plexiglas member.

Referring once again to FIGS. 7 and 8, each of the pulley/weight assemblies 68 is similarly constructed and operates in a similar fashion and therefore, in the interest of simplifying this explanation, only one of the weight assemblies 68 will be described in some detail. Referring specifically to FIG. 7, an exemplary weight assembly 68 includes a pulley wheel 118, first and second weight plates 120 and 122, respectively, and three post members, one of which is identified by numeral 121. Pulley wheel 118 forms an annular cable receiving channel 123 and a central hole (not labeled). Each of plates 120 and 122 is a generally triangular rigid plate and forms three openings, one at each of the corners of the plate. In at least some embodiments, plates 120 and 122 are formed of thick sheet metal so that they are relatively heavy. One corner of each plate is mounted to pulley wheel 118 via one of the posts 121 that passes through each of the plates 120 and 122 and through the central pulley wheel opening. The other two corners of the plates 120 and 122 are mounted via the other two posts 121 below the circumferential edge of pulley wheel 118. The plates 120 and 122 are mounted to wheel 118 in a loose fit manner so that as the wheel 118 turns, the plates 120 and 122 together hang down therefrom.

Each of the sloped mounting brackets 70 and 72 is similarly constructed and operate in a similar fashion and therefore, in the interest of simplifying this explanation, only mounting bracket 70 will be described here in detail. Bracket 70 includes an intermediate guide plate 112, a first mounting plate 114, and a second mounting plate 116, where the plates 112, 114 and 116 is integrally formed, preferably from bent sheet metal. First mounting plate 114 is an elongated plate that forms openings for passing fastening screws. Similarly, second mounting plate 116 is an elongated plate member forming openings for passing fastening screws. Intermediate plate 112 is a flat planar member that traverses the distance between one of the elongated edges of plate member 114 and one of the elongated edges of plate member 116. As best seen in FIG. 14, plates 114 and 116 are substantially perpendicular while plate 112 forms an angle with each of plates 114 and 116.

Referring once again to FIGS. 7, 8 and 14, to assemble retractor assembly 52, bottom plate/bracket 64 is secured to the bottom edge 106 of slotted wall member 56. Similarly, bottom plate/bracket 64 is secured to a bottom edge of slotted wall member 54. The first and second sloped mounting brackets 70 and 72 are secured, via screws or other mechanical fasteners, to the internal surfaces (e.g., see 103 in FIG. 7) of slotted wall members 56 and 54, respectively, near the top edges (e.g., see 104 in FIG. 7) thereof. First end wall 58 and second end wall 60 are secured via screws 100 to the first and second lateral edges 108 and 110 of wall member 56 and so that end wall members 58 and 60 extend in the same direction. The subassembly including sloped mounting bracket 72, slotted wall member 54 and bracket 62 are next positioned between the distal elongated edges of wall members 58 and 60 and the subassembly is fastened at that location via screws 100.

Referring still to FIGS. 7 and 8, divider members 66 are next slid into the oppositely facing slots 102 formed by slotted wall members 56 and 54. Here, it should be appreciated that the bottom plates/brackets 62 and 64 stop the divider members 66 from sliding completely through the other assembled components. At this point the retractor assembly components already assembled form six separate pulley wheel/weight receiving channels collectively identified by numeral 124 (see FIG. 8).

Figure 9:
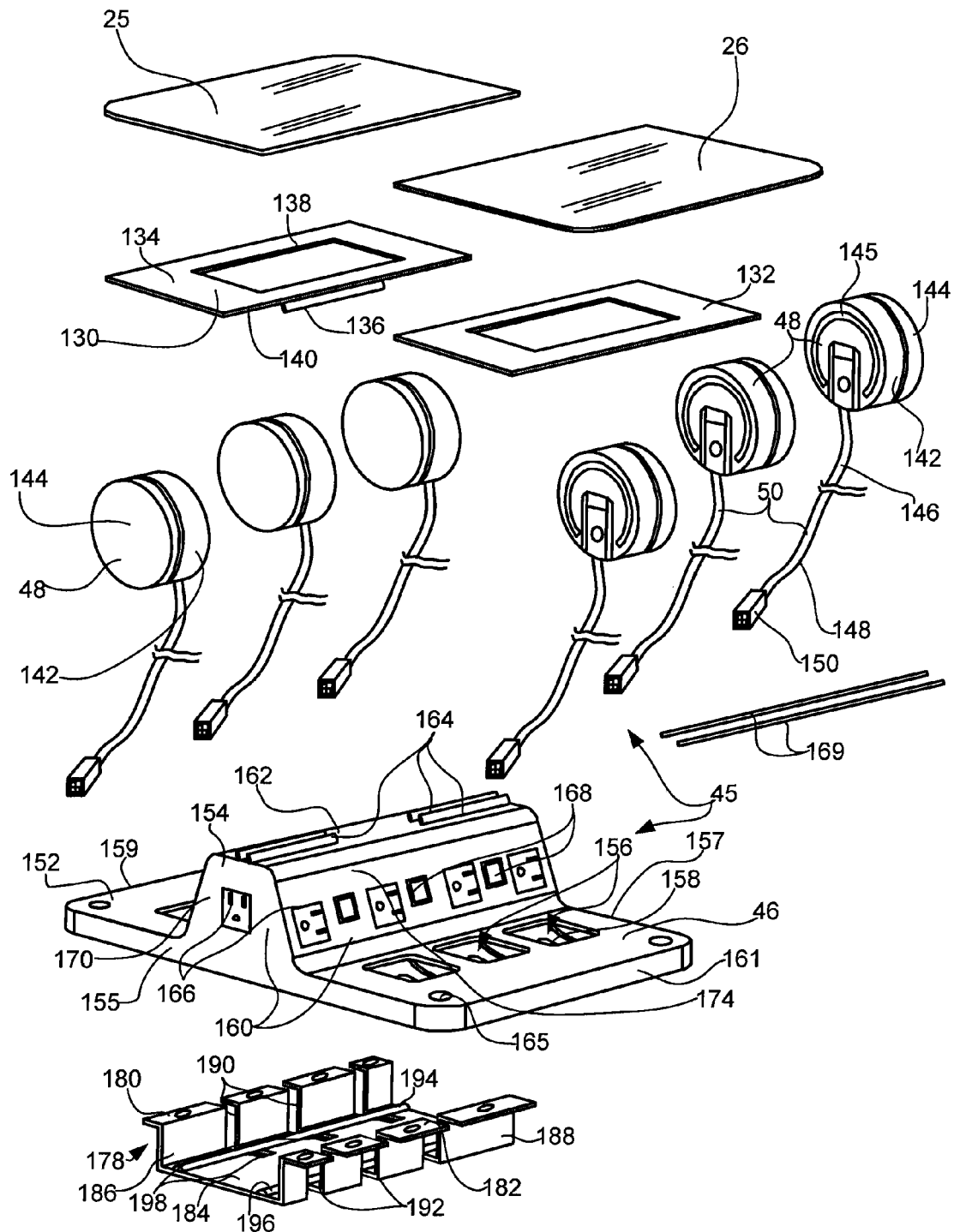
FIG. 9 is a partially exploded view of the deck assembly of FIG. 5.
Figure 10:
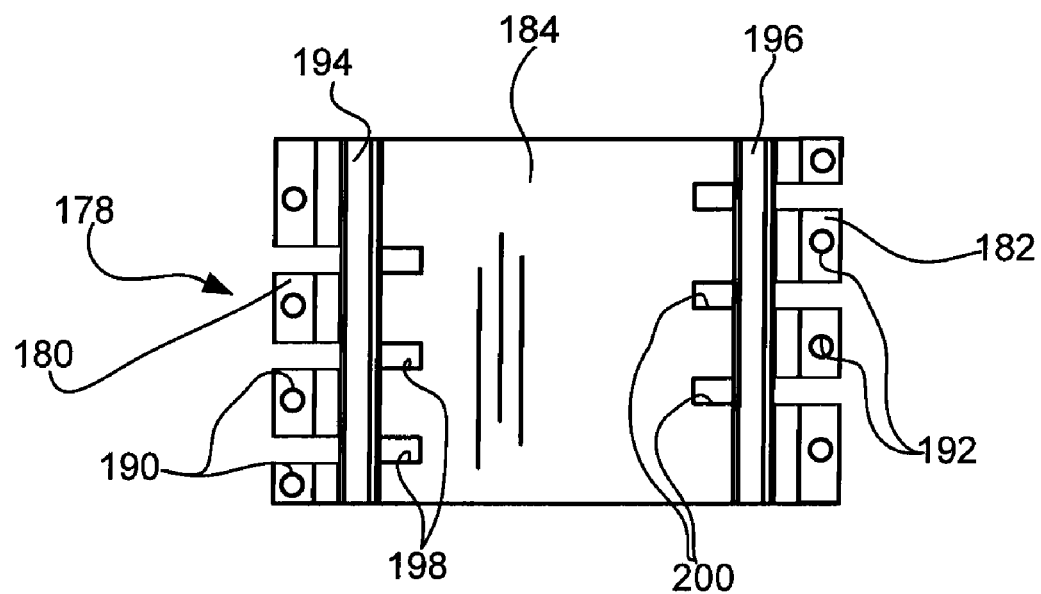
FIG. 10 is a top plan view of the cable tie bracket shown in FIG. 9.
Figure 11:
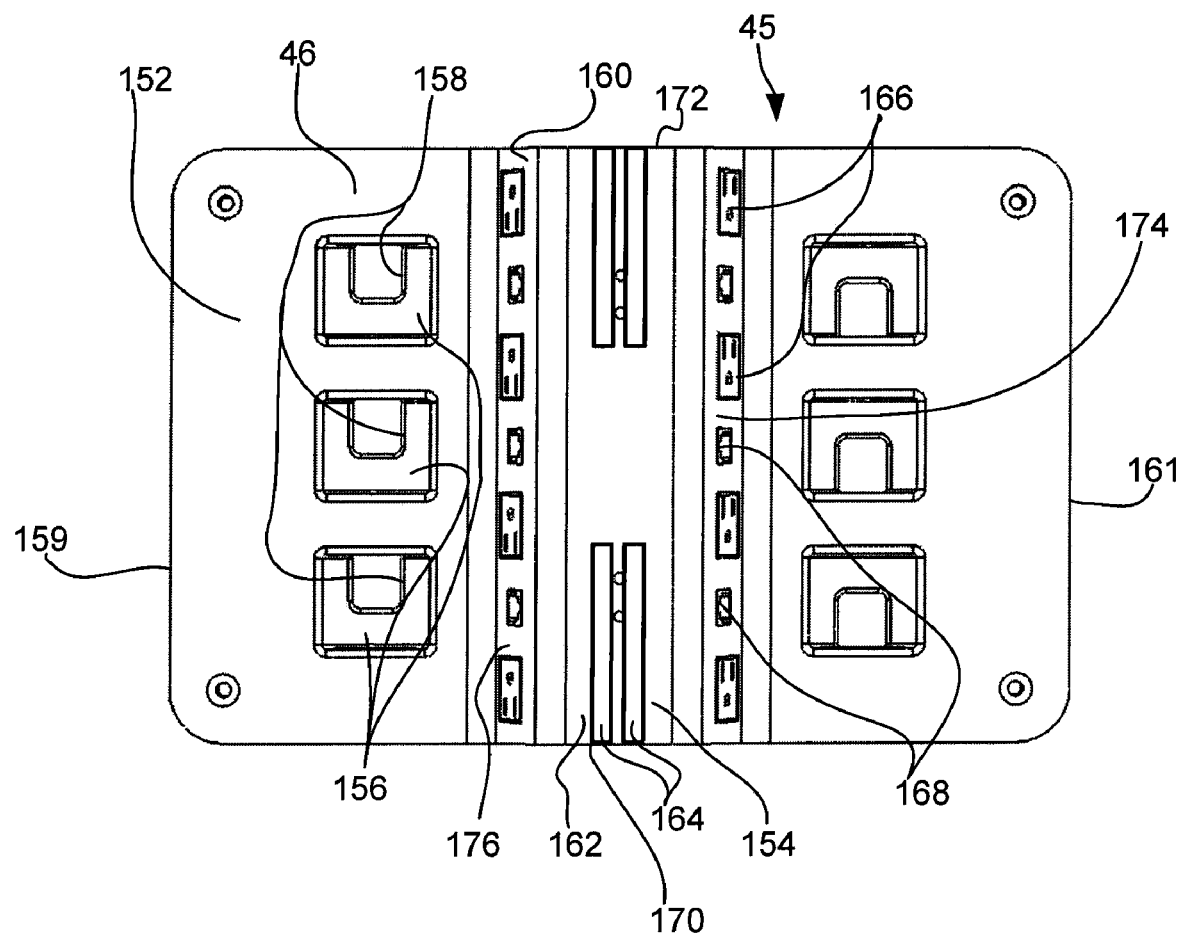
FIG. 11 is a top plan view of the deck member of FIG. 9.

Referring now to FIGS. 9, 10 and 11, deck assembly 45 includes a deck member 46, six separate hand sets collectively identified by numeral 48, control cables collectively identified by numeral 50 and a cable tie bracket 178. Deck member 46 is a generally rectilinear rigid member including first and second end edges 155 and 157, respectively, and first and second lateral edges 159 and 161, respectively. Deck member 46 forms a top deck surface 152. A deck island 154 extends upward from top surface 152. In the illustrated embodiment, island 154 is an elongated island that extends between first and second end edges 155 and 157 and that is centrally spaced between lateral edges 159 and 161. Island 154 is formed by a circumferential wall 160 including, generally, first, second, third and fourth substantially upright wall members 170, 172, 174 and 176 (see specifically FIG. 11) and a top wall that forms a top mounting surface 162. First and second island wall members 170 and 172 are substantially flush with deck edges 155 and 157, respectively, and face in opposite directions. Wall members 174 and 176 slant slightly toward each other from top deck surface 152 toward the top mounting surface 162 and generally face in opposite directions. Mounting surface 162 is substantially parallel to deck top surface 152. The island walls 170, 172, 174 and 176 together form an internal cavity (not illustrated or labeled) in which power and data receptacle boxes or hardware may be mounted. Each wall member 170, 172, 174 and 176 forms at least one opening for receiving a power and/or data outlet connector. In the illustrated embodiment, each of walls 170 and 172 forms a single opening for a power outlet (see 166 in FIG. 9) while each of walls 174 and 176 forms four substantially equi-spaced power outlets 166 and three data outlets, two of which are collectively identified by numeral 168. Island hinge members 164 are formed or fastened to the top mounting surface 162 for connecting the door members 25 and 26 in a manner to be described in more detail below.

Referring now to FIGS. 9 and 11, the top surface 152 of deck 46 forms six separate deck handset cavities collectively identified by numeral 156. Three of the handset cavities 156 are provided between island 154 and lateral edge 161 while the other three handset cavities 156 are provided between island 154 and other lateral edge 159. Each of cavities 156 is dimension and, in at least some embodiments, shaped, to snuggly receive one of the handsets 48 when the handset is in a stowed position. Deck member 46 also forms a cable passing opening 158 in each of the handset cavities 156 for, as the label implies, passing one of the handset cables 50.

Referring specifically to FIG. 11, the cable passing openings between island 154 and edge 159 are offset from or staggered between the openings between island 154 and edge 161. Thus, in FIG. 11 observe that openings 158 adjacent edge 159 are formed in the top portion of associated cavities 156 as illustrated while the openings 158 adjacent edge 161 are formed in the bottom portion of associated cavities 156. In addition, at each of its four corners, deck member 46 forms a screw passing opening, one of which is identified by numeral 165 in FIG. 9. In at least some embodiments deck member 46 is formed of molded plastic material.

Referring still to FIG. 9 and also to FIG. 10, cable tie bracket 178 is a rigid bracket, preferably formed of bent sheet metal, that includes a first mounting flange plate 180, a second mounting flange plate 182, an intermediate floor member 184, a first wall member 186 and a second wall member 188. The mounting flange plates 180 and 812 are each elongated rectilinear members that form screw passing openings and are arranged to be co-planar and substantially parallel to each other and spaced apart from each other. Wall member 186 is a rectilinear elongated member and is integrally formed along one of its long edges with one of the long edges of the first flange plate 180. Wall member 186 forms a right angle with flange plate 180. Similarly, wall member 188 is an elongated rectilinear member that is mounted along one of its long edges to one of the long edges of flange plate 182 and forms a right angle with plate 182.

Intermediate floor member 184 is a rigid rectilinear member having opposite edges linked to edges of wall member 186 and 188 opposite plates 180 and 182. Thus, facing surfaces of wall members 186 and 188 and a top surface of intermediate wall member 184 form a cavity or channel. Three slots (two of which are identified by numeral 190) are formed in flange plate 180, first wall member 186 and an adjacent portion of intermediate floor member 184 where each of the three slots is continuous through members 180 and 186 and passes into a portion of intermediate wall member 184. Similarly, three slots 192 are formed continuously through flange plate 184, wall member 188 and a portion of intermediate floor member 184. The slots 190 and 192 are interleaved with each other so that, when bracket 178 is mounted to an undersurface of deck member 46, slots 192 align with deck openings 158 thereabove that are formed between island 154 and lateral edge 159 and slots 190 align the deck openings 158 thereabove that are between island 154 and lateral edge 161. In other words, slots 190 align with deck openings 158 formed on an opposite side of island 154 and slots 192 align with deck openings 158 forme on an opposite side of island 154.

Referring to FIGS. 9 and 10, half dome bars 194 and 196 are secured to a top surface of floor member 184 approximately midway along the lengths of the portions of slots 190 and 192 formed in floor member 184 so that distal ends of the slots 190 and 192 are open and form exit ports 198 and 200. As the label implies, each half dome bar 194 and 196 forms a smooth half dome surface and has a half dome cross sectional shape.

Referring again to FIG. 9, each of the handsets 48 is similarly constructed and operates in a similar fashion and therefore, in the interest of simplifying this explanation, the handsets 48 will only be generally described. An exemplary hand set 48 includes an annular handset housing member 142 and a button 144 mounted to the housing 142. The button 144 can be pressed to provide a signal to a switcher box (see 84 in FIG. 14). Referring still to FIG. 9, on an undersurface of the housing 142 opposite the button 144, a slip-resistant pad 145 is adhered to, as the label implies, impede sliding of the handset 48 when the undersurface 145 is placed on a supporting work surface or the like. The slip resistant pad 145 may be formed of plastic or rubber type material. In at least some embodiments each handset 48 is constructed to be relatively heavy (e.g., on the order of one-half to two pounds and generally around one to one and one-half pounds) so that when the handset is pulled into a use position, the handset weight will generally retain the handset in the use position until affirmatively replaced in the well 69. Each of the cables 50 has first and second ends 146 and 148, respectively. The first end 146 is linked to an associated handset 48 while a connector jack 150 is secured at the second end 148.

Figure 12:
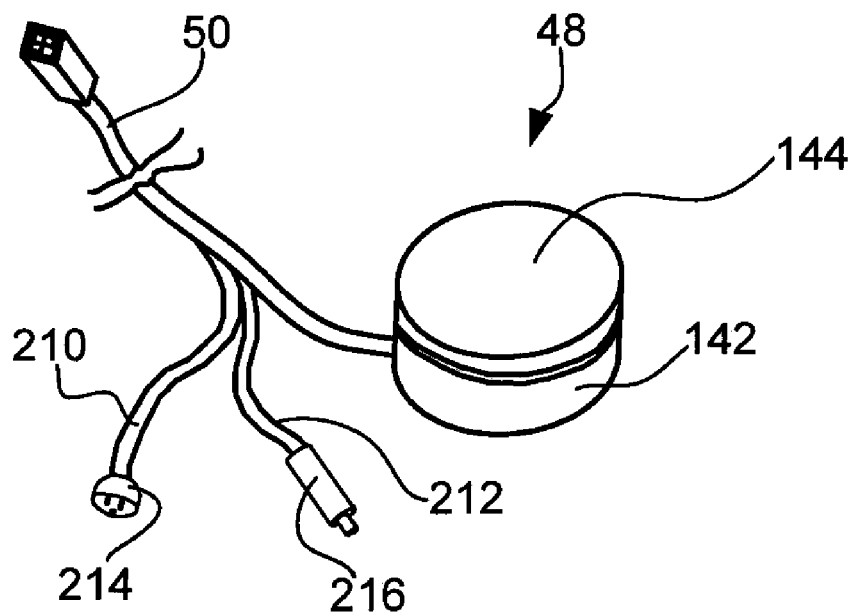
FIG. 12 is a perspective view of an exemplary handset and cable assembly including video and audio cables and jacks.

In at least some embodiments, referring also to FIG. 12, in addition to including wires for transmitting select type signals from the handset 142, the cable 50 will include a video cable 210 and an audio cable 212 that split off from other portions of the cable 50 proximate the handset end thereof. As shown in FIG. 12, a video jack 214 and an audio jack 216 are provided at distal ends of the cables 210 and 212, respectively, for linkage to a laptop computer or the like. Although not shown, in at least some cases, video and audio cables will split off from the control cable at the end of cable 50 opposite handset 48 and jacks will be provided at that other end for linking to the switcher box 84. In still other embodiments, the audio and video cables may be replaced by digital transfer data cables such as USB cables or the like that can carry audio, video and other data types such as control signals from the handsets to the switcher device 84.

Referring yet again to FIG. 9, door members 25 and 26 are substantially rectilinear, rigid and flat members, each of which includes a top surface and an oppositely facing bottom surface. Together, the door members 35 and 26 form a shape that is substantially similar to the shape of table top opening 27, albeit having slightly smaller width and length dimensions than opening 27 to that, when the door members 25 and 26 are in a closed position as shown in FIG. 14, gaps G exist between adjacent edges of the door members 25 and 26 and the edge that forms opening 27. The gaps G are sized such that cables 50 can pass therethrough while the doors 25 and 26 are closed (see also FIG. 16 in this regard).

Referring yet again to FIG. 9, the assembly also includes first and second hinge plates 130 and 132. Each of the hinge plates 130 and 132 is similarly constructed and operates in a similar fashion and therefore, in the interest of simplifying this explanation, only hinge plate 130 will be described here in detail. Plate 130 is a rigid rectilinear and flat member that forms a top surface 134, a rear edge 140 and a central rectilinear opening 138. A hinge member 136 is integrally formed or attached to an undersurface of member 130 adjacent rear edge 140. The hinge member 136 is designed to cooperate with hinge members 164 and hinge pins 169 to secure plate 130 to the top mounting surface 162 of island 154.

To assemble deck assembly 45, screws (not illustrated) are used to mount bracket 178 to an undersurface of deck member 46 with the slots 190 and 192 aligned with openings 158 formed by deck member 46. Next, door members 25 and 26 are secured to the top surfaces (e.g., 134) of hinge plates 130 and 132 via adhesive or some type of mechanical fastener. Pins 69 are used to secure hinge members 136 on plates 130 and 132 to hinge members 164 on the top mounting surface 162 so that door members 25 and 26 extend above separate halves of the deck top surface 152.

Referring now to FIGS. 8, 9 and 14, assembly continues as follows. One of the handsets/cable subassemblies is aligned with one of the handset cavities 156 and the distal end 148 of the handsets/cable subassembly is passed through the aligned cable passing opening 158.

Referring still to FIGS. 8, 9 and 14, the distal end 148 of the cable 50 is next looped around the pulley wheel (see 118 in FIG. 7) of one of the pulley/weight assemblies 68 and is fed back to toward bracket 178 and through an aligned one of the slots (e.g., 190) and into the cavity formed by bracket 178. The distal end 148 of the cable 50 is looped over the half-dome bar 194 and is passed through and aligned exit port (e.g., 198). The distal end 148 is pulled through the exit port until a portion (e.g., one foot) thereof extends down below bracket 178. Continuing, a zip strip or other mechanical fastener is used to fasten the portion of cable 50 adjacent half-dome bar 194 to bracket 178 so that at least that portion of the cable 50 is securely attached to the bracket 178. When the handset 48 is received within the deck handset cavity 156, pulley/weight assembly 68 hangs down below bracket 178 as shown in FIG. 14.

Continuing, referring still to FIGS. 8, 9 and 14, each of the handset/cable subassemblies 48 and 50 is aligned with a separate one of the handset cavities 156, the distal ends of the cables are passed through the deck openings 158 and looped around separate ones of the pulley wheels 118 and back up through one of the slots 190 or 192 into the bracket 178 cavity and down through an associated one of the exit ports 198 or 200. Again, zip strips or other mechanical fasteners are used to secure intermediate portions of each of the cables 50 to bracket 178. Once each of the handsets/cable subassemblies has been secured to the deck 46 and bracket 178, all of the pulley/weight assemblies 68 should hang down below the bracket 178 such that adjacent pulley/weight assemblies 68 are arranged in a substantially parallel fashion.

Continuing, referring specifically to FIG. 5, the subassembly including the deck assembly 45, door members 25 and 26 and pulley/weight assemblies 68 can be aligned above the already assembled components of the retractor assembly 52 with each of the pulley/weight assemblies 68 aligned above a separate one of the channels 124 (see also FIG. 8). The deck assembly 45 and other connecting components can be moved down toward assembly 52 so that each of the pulley/weight assemblies 68 slides down into one of the channels 124 until an undersurface of deck member 46 contacts mounting plates 114 of the first and second sloped mounting brackets 70 and 72, respectively (see also FIG. 7). Screws or other mechanical fasteners are used to secure the mounting plates 114 to the undersurface of deck member 46. At this point, the entire wire management assembly 24 has been assembled.

Referring now to FIGS. 5 and 14, to secure the wire management assembly 24 to the leg support structure 18, wire management assembly 24 is aligned above the table top opening 27 and is slid down into channel 82 until an undersurface of deck member 46 contacts the top surface 85 of top plate 79. Screws passing through deck member openings 165 (see also FIG. 9) are used to secure deck member 46 to top surface 85. At this point, when door members 25 and 26 are in their closed positions as shown in FIG. 14, top surfaces thereof should be substantially flush with the top surface 21 of table top member 20 and gaps G should exist between adjacent edges of door members 25 and 26 and the edge forming opening 27. Switcher device or control box 84 is mounted via a bracket 98 (see also FIG. 6) between two of the vertical leg members 76. Distal ends 148 of the cables 50 are linked to separate ports of the switcher device 84. Here, where one of the cables 50 includes a control line in addition to audio and video cables, each of the control line and audio and video cables may be linked to separate ports on the switcher device 84, albeit the video and audio and control ports being associated by the switcher device 84.

Referring to FIG. 6, an output audio/video cable 99 is linked to an output port of the switcher device 84 at one end and to display 36 and, possibly, speakers or the like, at an opposite end.

Figure 1:
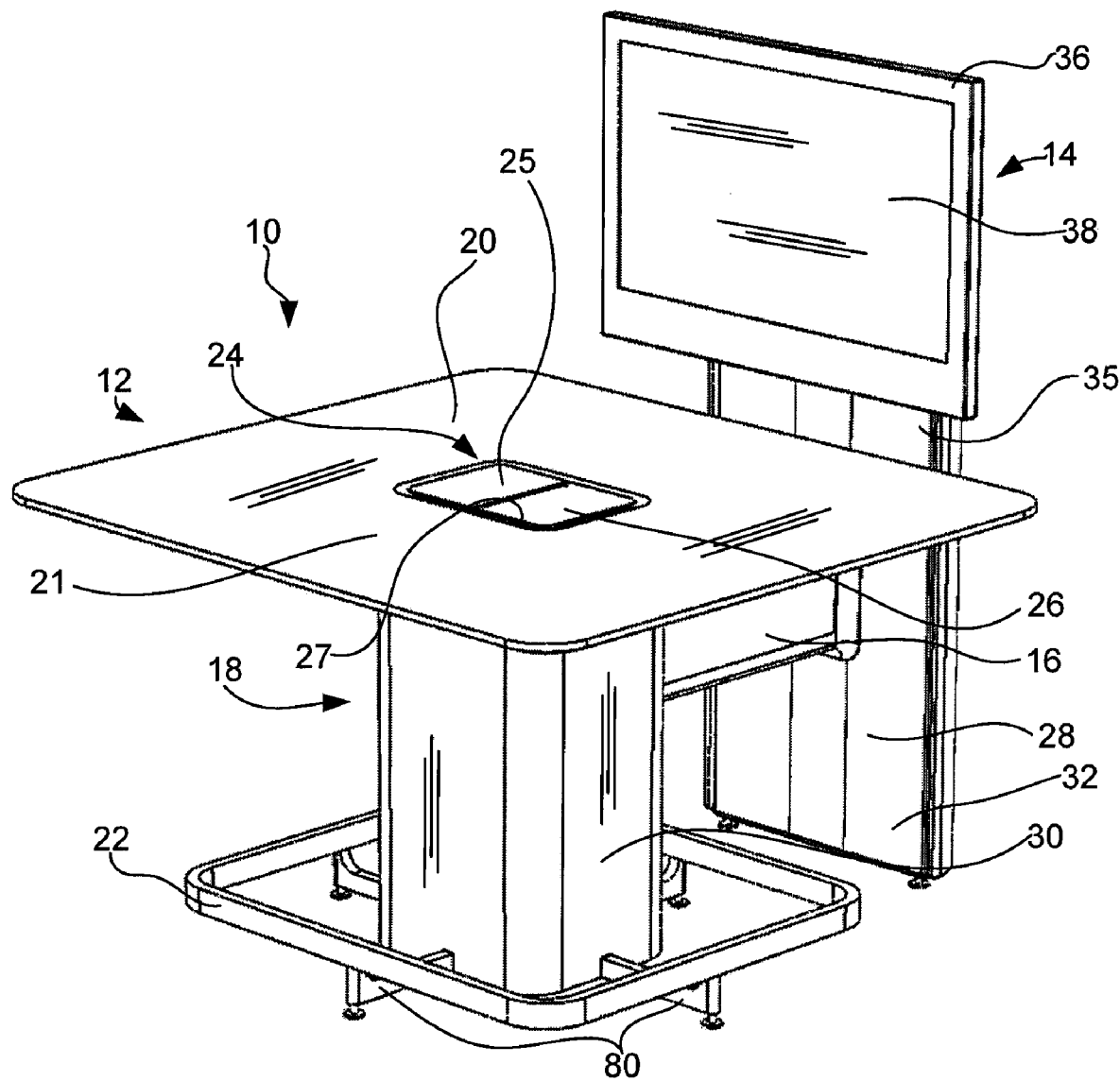
FIG. 1 is a perspective view of a conferencing table assembly that is consistent with at least some aspects of the present invention.
Figure 2:
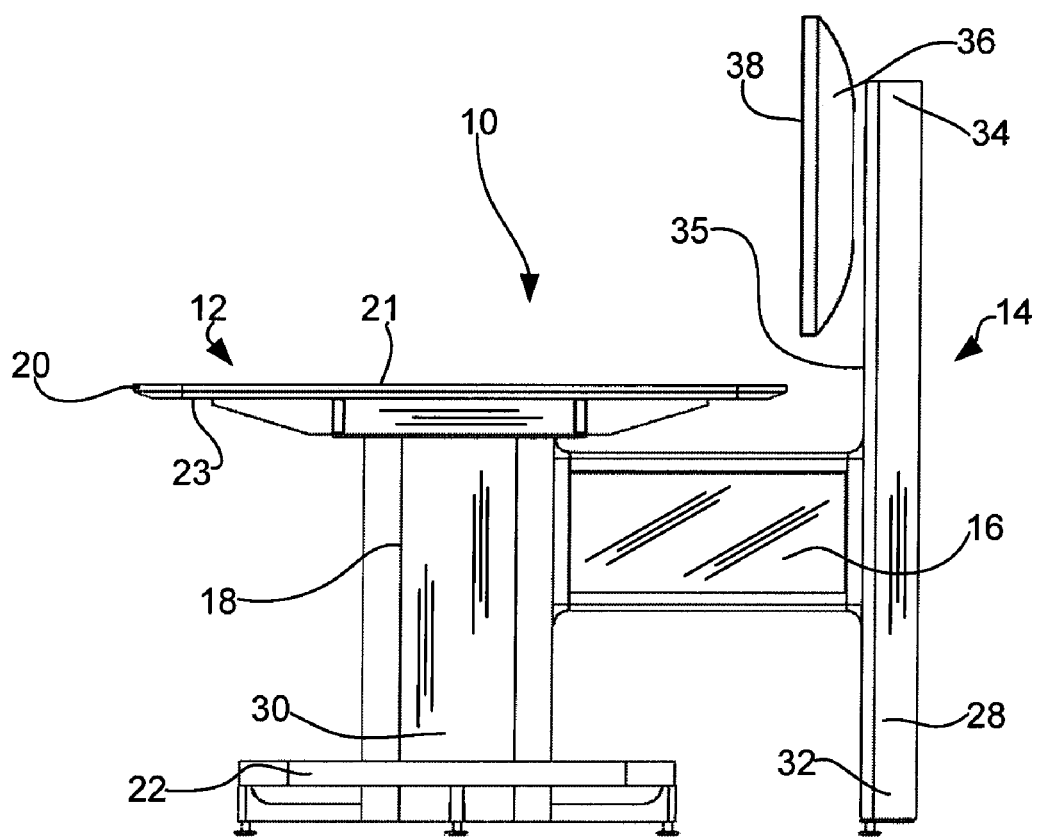
FIG. 2 is a side of plan view of the conferencing table assembly of FIG. 1.
Figure 3:
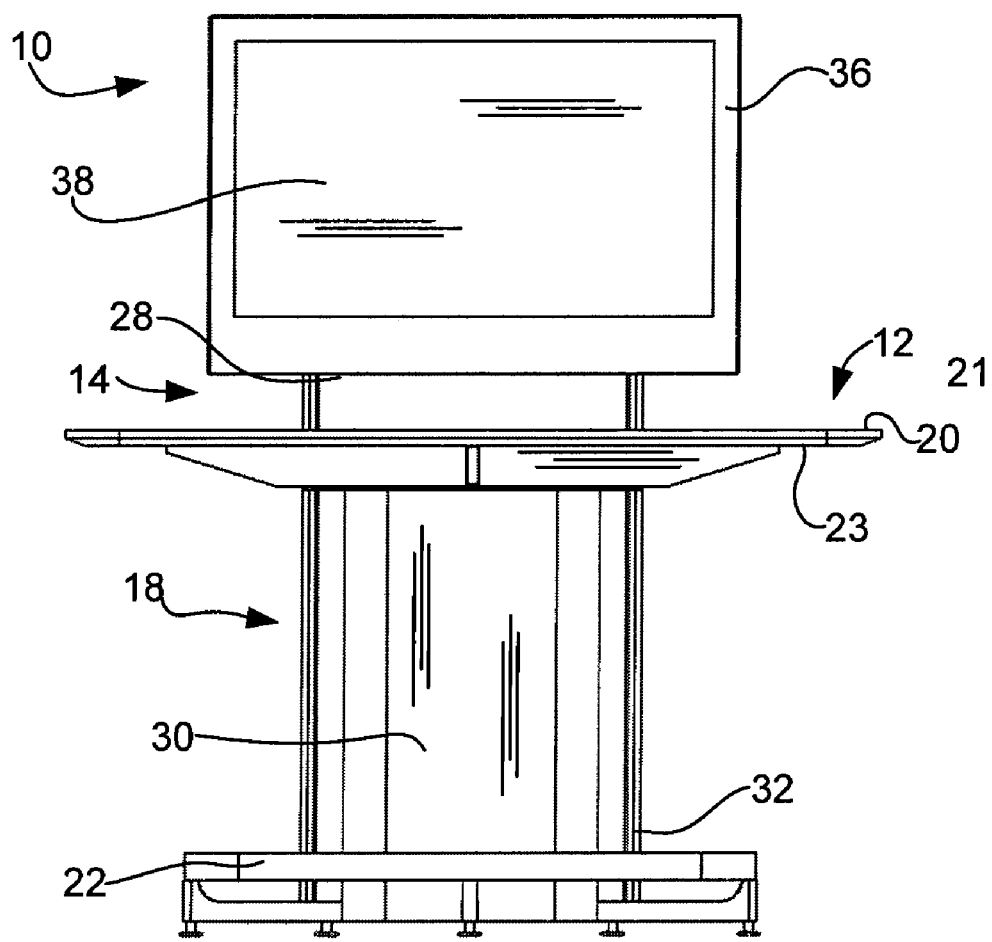
FIG. 3 is a front plan view of the conferencing table assembly of FIG. 1.
Figure 4:
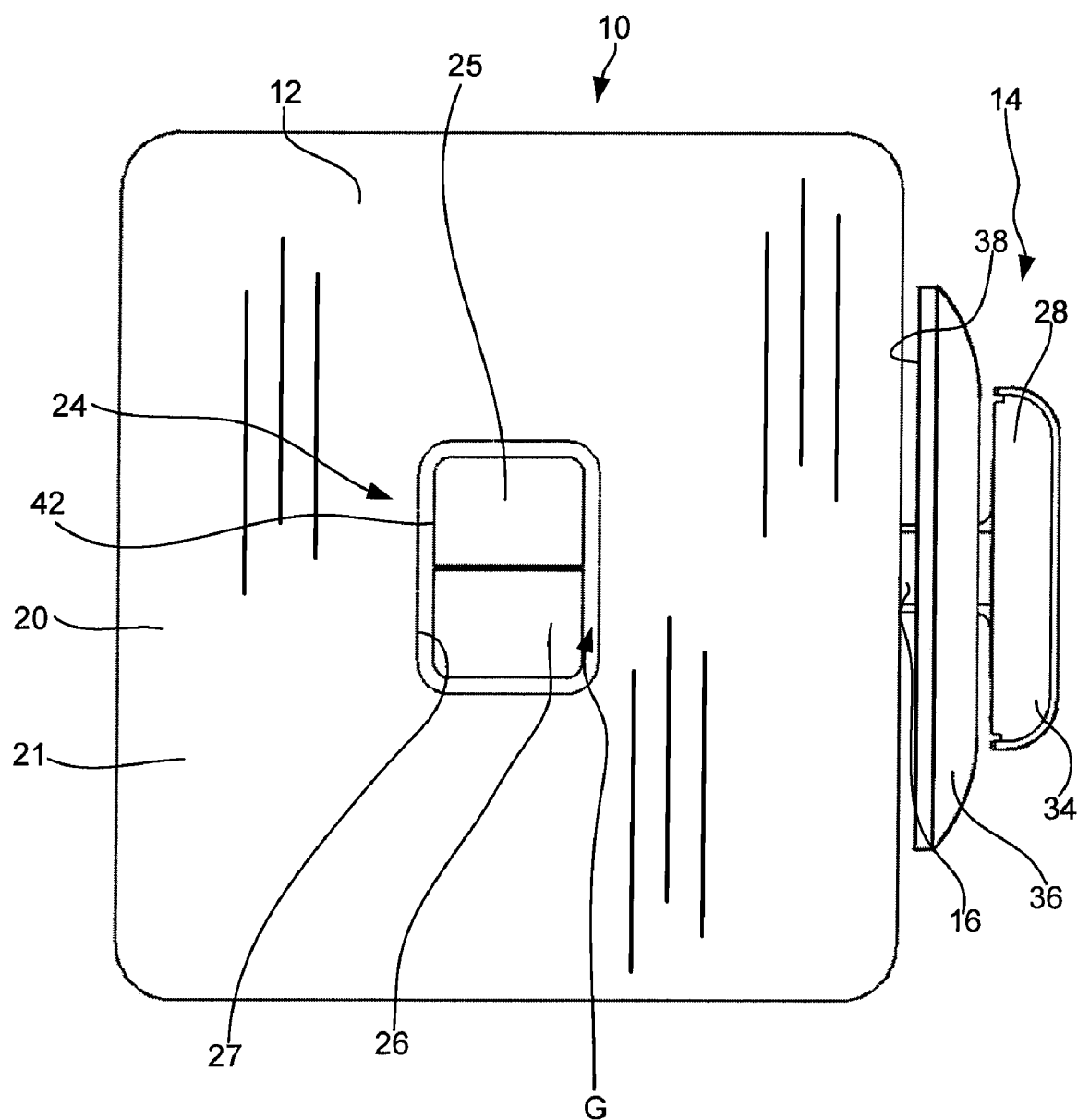
FIG. 4 is a top plan view of the conferencing table assembly of FIG. 1.
Figure 17:
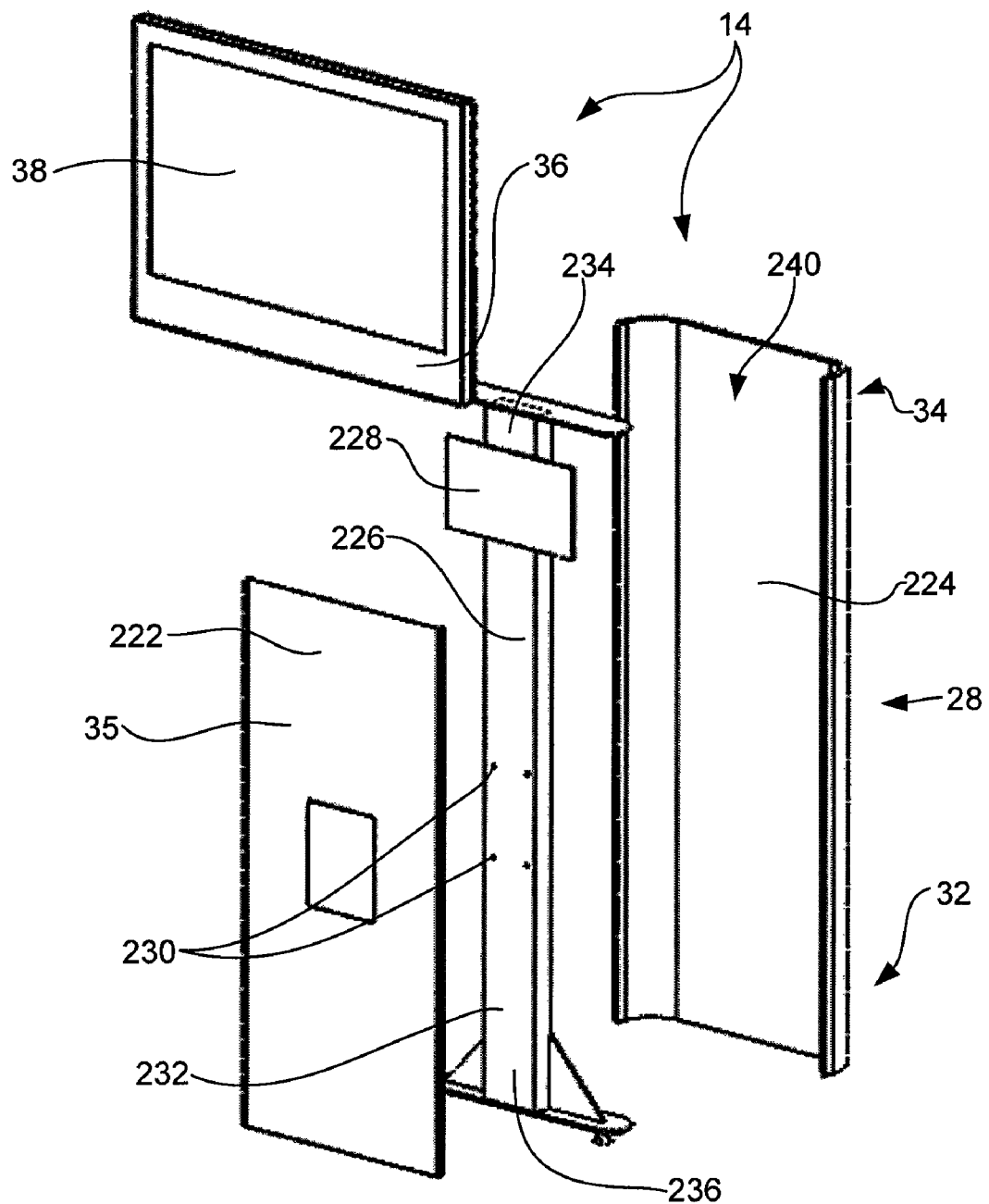
FIG. 17 is an exploded view of the totem/display assembly shown in FIG. 1.

Referring now to FIGS. 1, 6 and 17, the totem/display assembly 14 includes a totem 28 and a display screen 36. Totem 35 includes structural and exterior housing members, as the label implies, form an elongated vertical or upright totem having a bottom end 32 and a top end 34 that forms a front surface 35. More specifically, totem assembly 28 includes a vertical internal structural beam 226, a front housing cover 222, a rear housing cover 224 and a display mounting plate 228. Beam 226 is an elongated rigid beam having top and bottom ends 234 and 236, respectively, and forms a front surface 232. Surface 232 forms four apertures 230 used to secure a structural bridge member (see 78 in FIG. 18) to beam 226.

Plate 228 is a rigid flat and rectilinear member mounted to front surface 232 via welding or mechanical fasteners proximate top end 234.

Cover 226 is a flat, rigid and substantially rectilinear member that forms an opening 238 for passing one end of bridge structural member 278. Cover 224 is generally an elongated C-shape in cross-section and includes flanges along long edges thereof for securing front cover 222. Covers 222 and 224 mount to beam 228 via mechanical fasteners (not shown) to form the totem 28 and form an internal cavity 240 when assembled. Display 36 mounts to plate 234. Display screen 36 includes a housing structure and a display front surface 38. In at least some embodiments, the totem/display assembly 14 cannot stand in an upright position alone.

Figure 18:
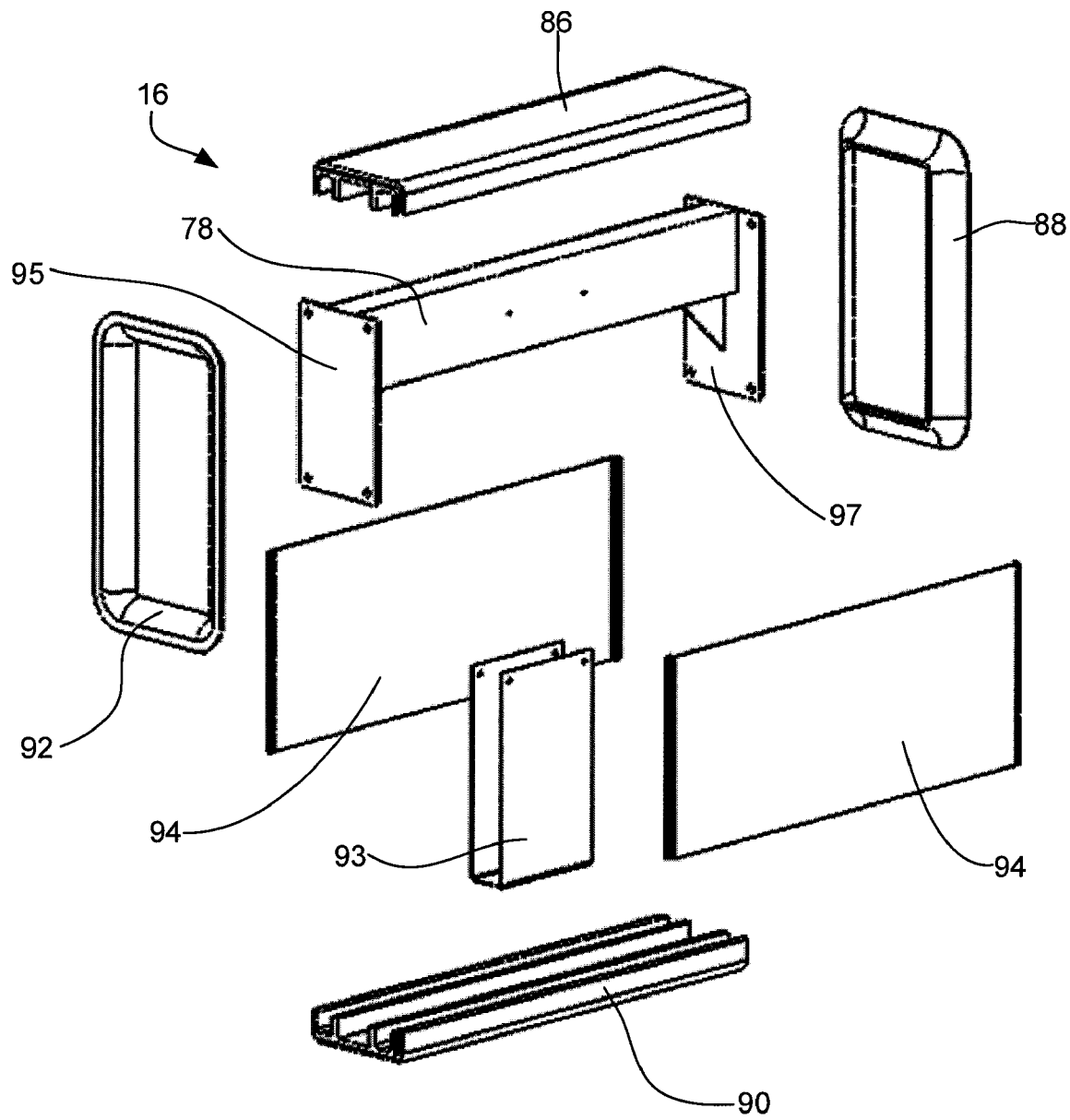
FIG. 18 is an exploded view of the bridge assembly of FIG. 1.

Referring still to FIG. 6 and also to FIG. 18, bridge assembly 16 includes a rigid elongated support member 78 that is mechanically fastened via screws or the like or is welded to the vertical leg members 76 of leg support structure 18 at one end and to the internal vertical structure beam 226 of totem assembly 28 at the opposite end. In the illustrated embodiment, beam 78 includes first and second mounting plates 95 at opposite ends for securing to the leg assembly 18 and the totem structural beam 226. In at least some embodiments, member 78 is a metallic beam type member. Through member 78, the table leg structure 18 provides additional support to totem assembly 28.

A cable trough forming bridge housing includes a top housing member 86, a bottom housing member 92, first and second end shoes 88 and 90, respectively, two side plates 94 and a U-shaped bracket 93. The top and bottom housing members 86 and 92 extend between the leg structure 18 and totem assembly 28 above and below beam member 78 and form a bridge channel 96 there between (see phantom in FIG. 6). The end shoes 90 and 88 abut against the leg structure 18 and the front surface 35 of totem assembly 28 and provide a finished look. U-shaped bracket 93 mounts to bridge beam 78 via screws or other mechanical fasteners and extends down therefrom. Bracket 93 operates as a cable manager and also as a structure to which housing member 92 can be connected. The bridge cover member 94 can be mechanically or otherwise fastened to the top and bottom housing members 86 and 92 to close off the bridge channel 96. In at least some embodiments, the cover members 94 can easily be removed to access channel 96 for laying cables therein or routing cable when appropriate.

Figure 13:
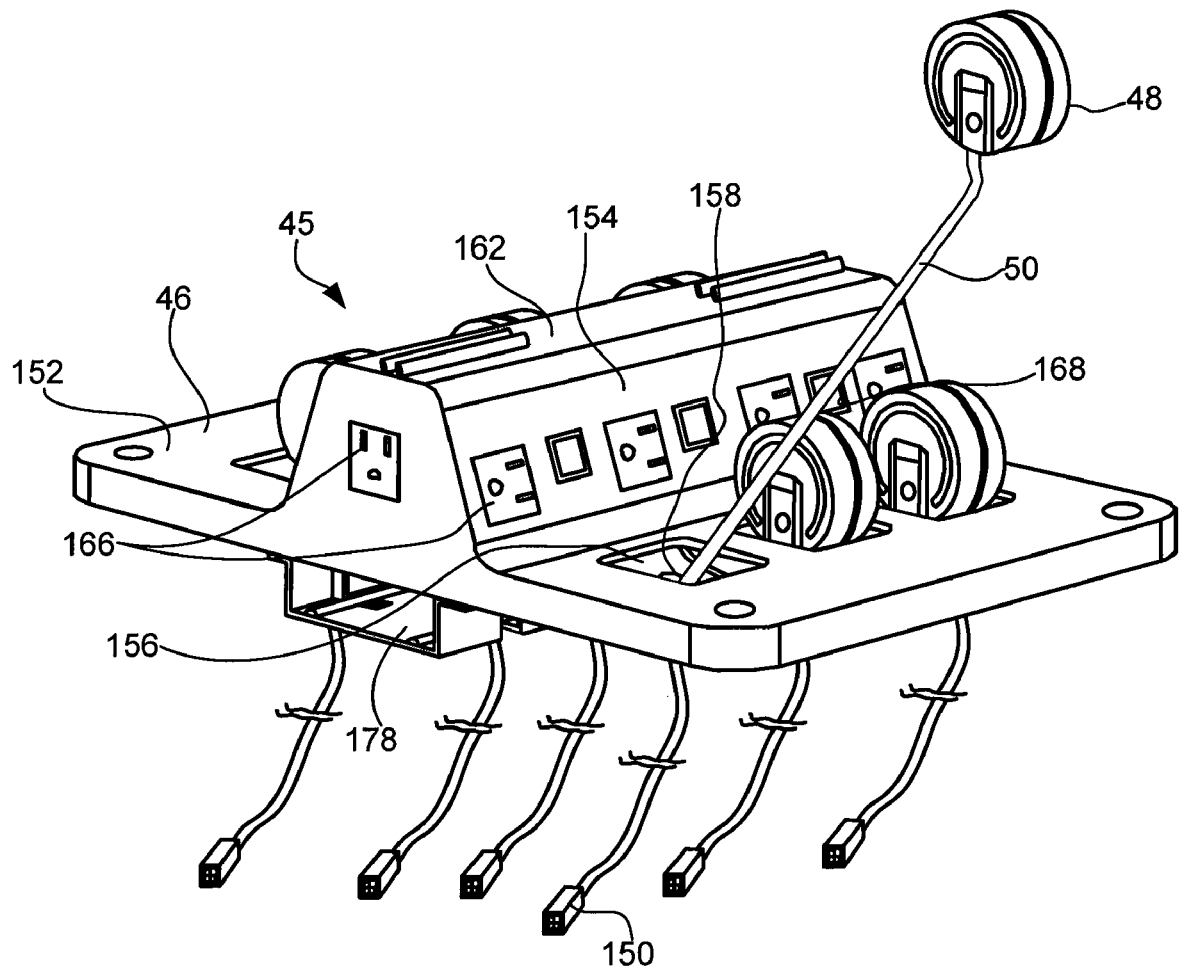
FIG. 13 is a perspective view of the deck assembly shown in FIG. 9.
Figure 15:
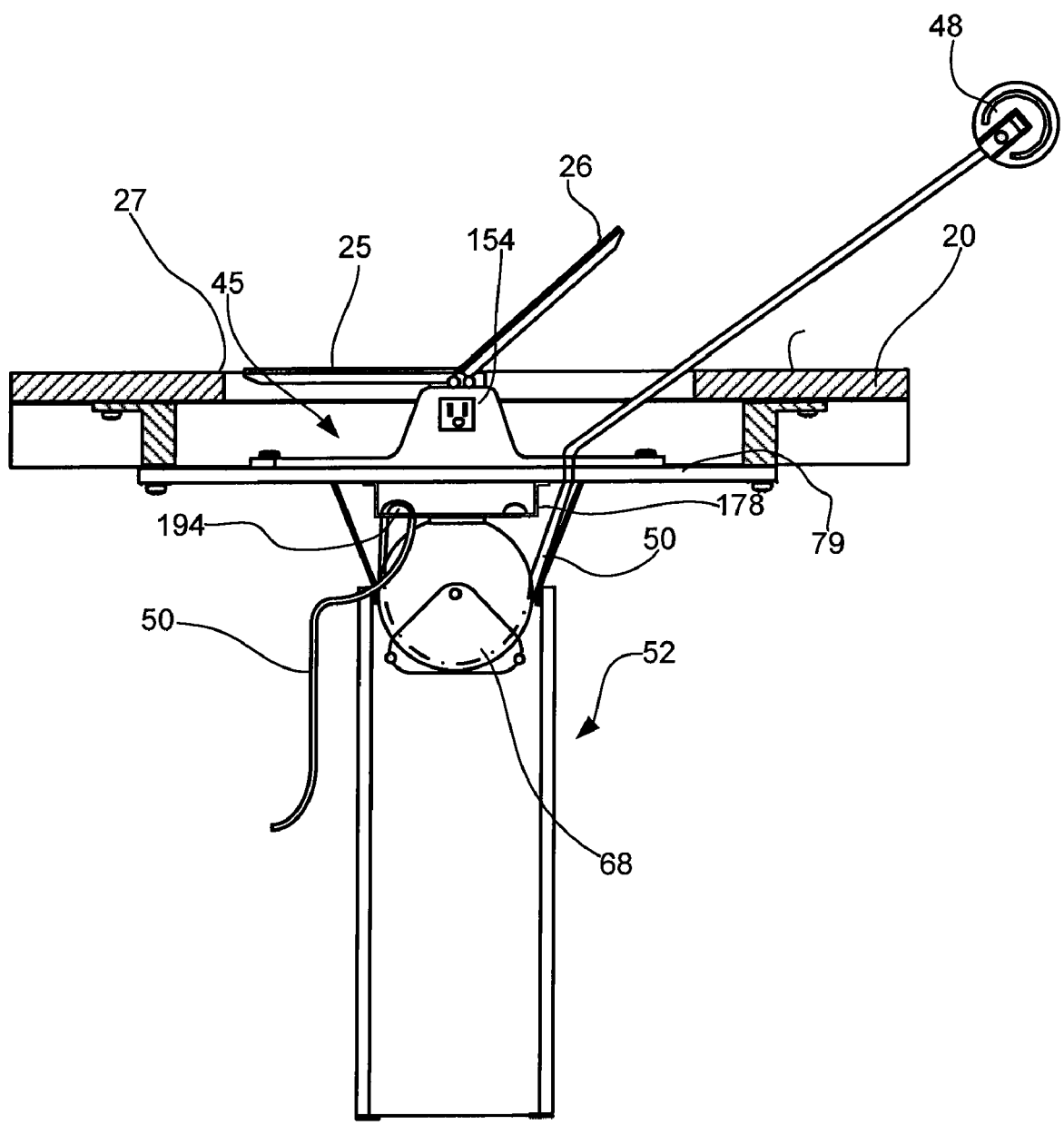
FIG. 15 is similar to FIG. 14, albeit showing the single handset pulled out of a cavity.

Referring now to FIG. 14, operation of the retractor assembly 52 will be described in the context of the illustrated system that includes only a single handset/cable subassembly in the interest of simplifying this explanation. When handset 48 is not in use, handset 48 can be received within an associated handset cavity 156 (see also FIG. 13) which allows the pulley/weight assembly 68 to slide down in its associated channel 124 toward the bottom end of the retractor assembly 52. When a conference attendee wishes to use one of the handsets 48, referring also to FIG. 15, the attendee can rotate door member 26 on its hinge to an open position, grasp the handset 48 and pull the handset out from within the cavity formed below the door member 26. As the handset 48 is pulled up and out of the cavity, pulley/weight assembly 68 slides upward within the channel 124.

Figure 16:
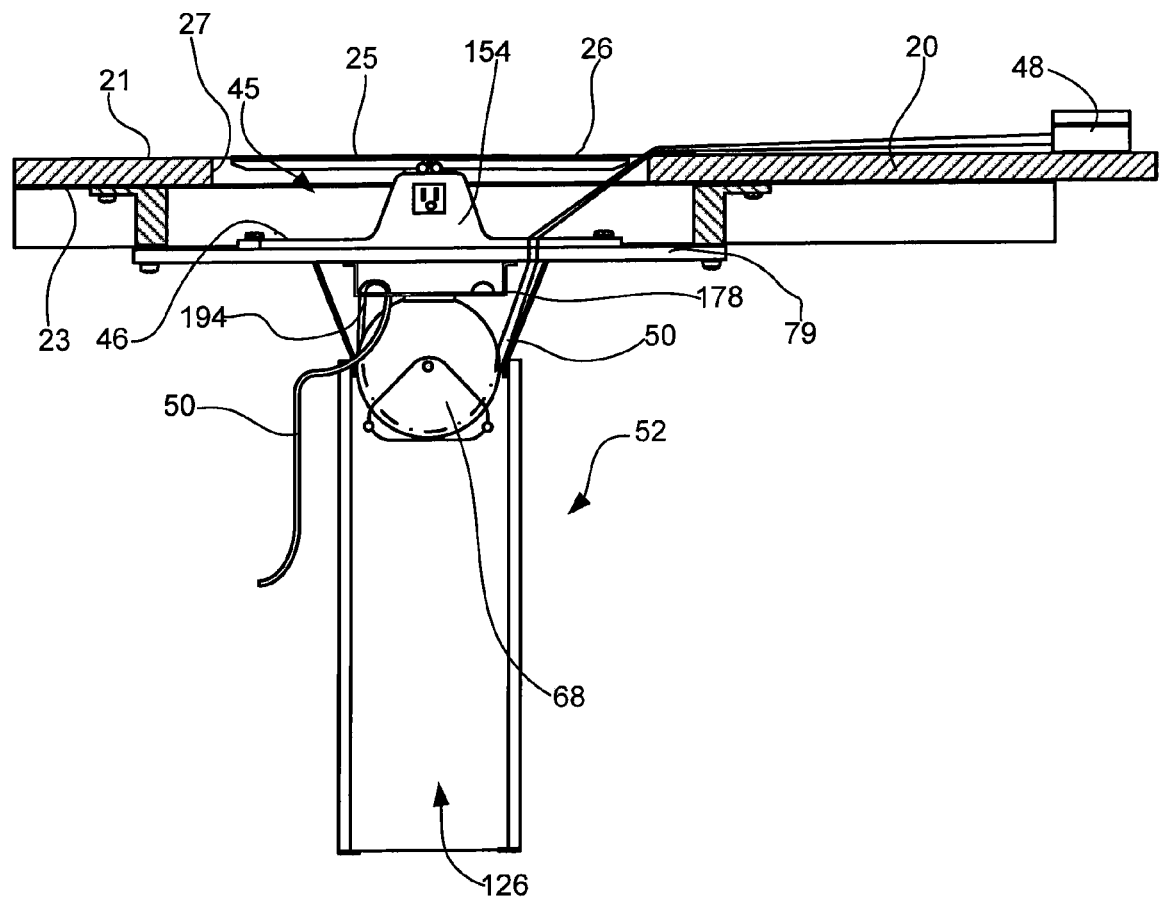
FIG. 16 is similar to FIG. 14, albeit showing the handset in a use position with a cavity door member in a closed position.

Referring now to FIG. 16, the attendee can place the handset 48 with its undersurface on top surface 21 of tabletop member 20. The attendee can close door 26. The nonslip undersurface of handset 48 and the weight of the handset 48 cooperate to retain the handset 48 on the top surface 21 despite the weight of the pulley/weight assembly 68. Nevertheless, pulley/weight assembly 68 maintains the portion of the cable 50 above the top surface 21 taught. Continuing, where the cable 50 includes audio and video cables (see FIG. 12), the attendee can link those cables to the attendee's laptop and, when appropriate, select the handset button to take control of information presented via the display screen 36.

After a conference has been completed, attendees can unlink their laptops from the cables 50 and replace their handsets 48 within the cavity or well 69 below doors 25 and 26. To this end, referring once again to FIGS. 15 and 16, an attendee can open door 26 and lift the attendee's handset 48 from top surface 21. As the attendee moves the handset 48 toward well 69 below door member 26, the pulley/weight assembly 68 moves down within cavity 124 thereby aiding the attendee in replacing the handset in the stowed position. Referring to FIG. 14, eventually the handset 48 is placed back in the associated handset cavity 156 in its stowed position.

While one embodiment has been described above, it should be appreciated that the concepts described above may be applicable in many different embodiments. For example, the exemplary wire management assembly and totem and bridge concepts may be used with tabletop members that have other shapes such as, for instance, oval, round, etc. In addition, all of the concepts described above may be used with table assemblies that do not include a footrail or additional supporting foot members or with leg support structures that have different height dimensions than those illustrated. Moreover, while the embodiment that is described above includes six separate handsets, it should be appreciated that other embodiments are contemplated that may include more or less handsets such as, for instance, embodiments that include four handsets, eight handsets, etc.

Moreover, other embodiments are contemplated that may include two or more wire management assemblies 24 and associated leg support structures 18 for supporting larger tabletop members. Furthermore, other embodiments are contemplated that may include a switcher device linked to two or more display screens or that include wall mounted or cart mounted display screens that can be positioned independent of other table assembly components. To this end, see FIG. 18 that shows a two leg table assembly including first and second totem/display assemblies 14 and 14b, respectively, two leg structures 18a and 18b, respectively, a single table top 20', a single foot rail 22', first and second wire management assemblies 24a and 24b, respectively, and first and second bridge assemblies 16a and 16b, respectively. Here, it may be that only one switcher device is provided or, in some cases where two devices are provided, the devices may be linked so that simultaneous control of the display screens results. In some cases one attendee may control one display while another attendee controls the second display screen.

In still other embodiments, in addition to having inputs from computers associated with each of the handsets, there may be other inputs to the video switcher. For instance, in at least some embodiments a room PC may link into the table switcher so that room PC content or content accessible via the room PC can be presented via the display screens. In another instance video conference input may be provided to the switcher to facilitate remote video conferencing. As still one other instance, an electronic virtual whiteboard may be linked to the switcher as another possible input. In each of these cases the other source would be selectable via a selection made using the other source (e.g., via a keyboard selection, an interface key selection, etc.) and, in at least some cases the other source would be linked through the leg structure to the switcher. Both wired and wireless communication with the switcher are contemplated here.

Figure 19:
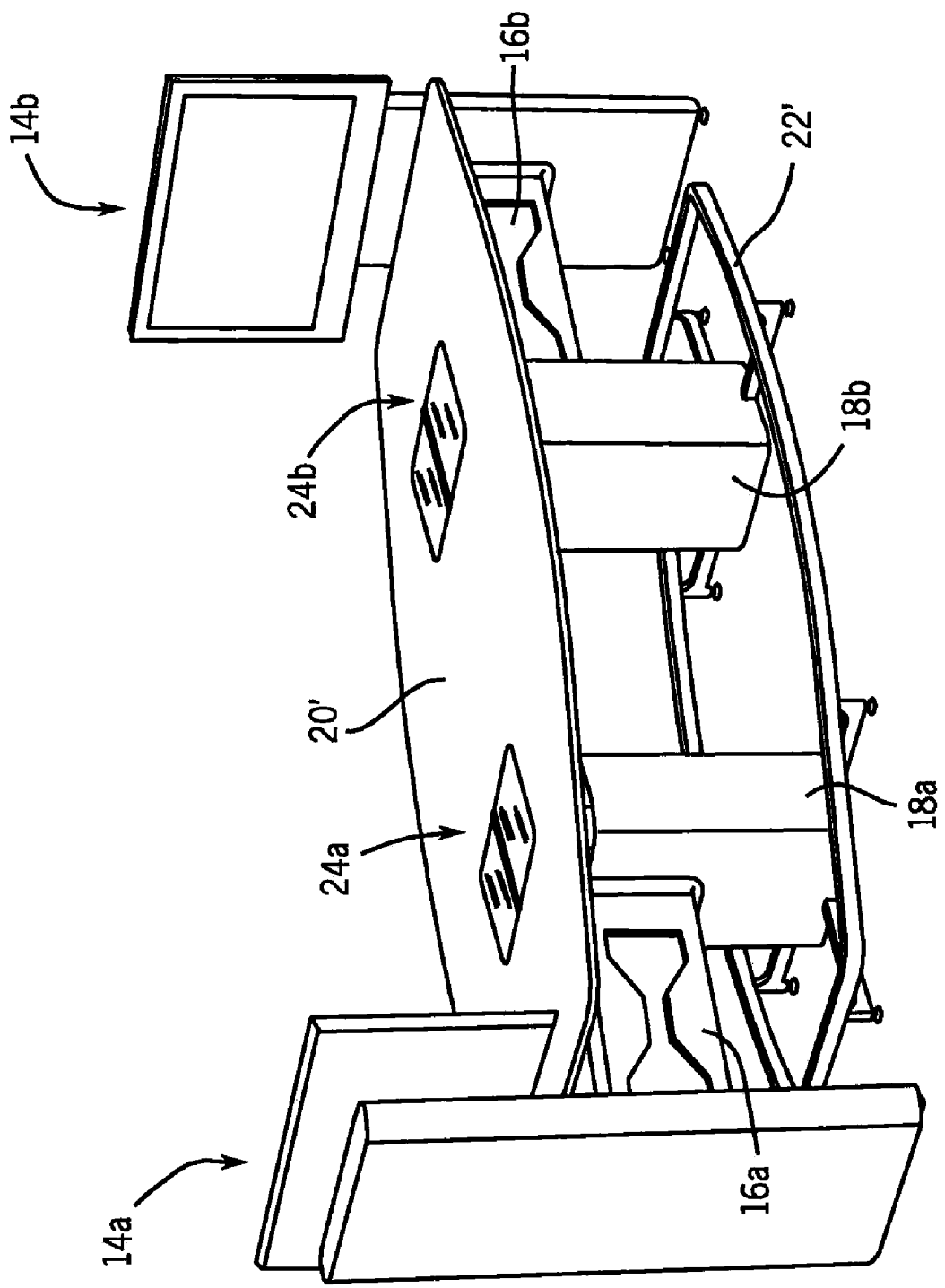
FIG. 19 is a perspective view of a two display conferencing table.
Figure 20:
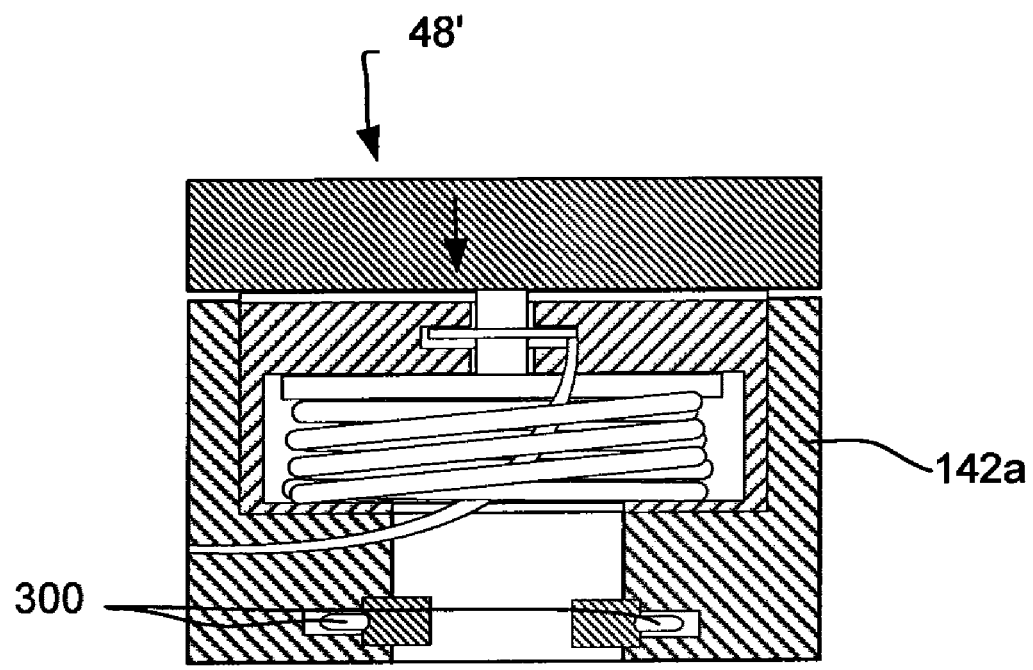
FIG. 20 is a cross sectional view of a handset that includes LEDs for signaling different conditions.

Referring to FIG. 19, in some cases a handset 48' may include a housing 142a, 1 button 144a and one or more LEDs 300. In the illustrated embodiment, the housing 142a may be formed of a transparent or semitransparent material (e.g., Plexiglas) so that when the LEDs are illuminated, light shines through the housing. In at least some cases LEDs may be illuminated when a laptop associated with a specific handset is selected to control the displays. In some cases a handset may have several different colors of LEDs to indicate different statuses. For instance, when no laptop is linked and associated with a handset, no LEDs may be illuminated in the handset. Once a handset is linked to a laptop and when the linked laptop is not driving the display, a white LED may be illuminated. When a laptop is currently driving the display, a green LED may be illuminated.

In addition, while the illustrated embodiment shows a retractor assembly 52 for use with switcher control cables and audio/video cables, it should be appreciated that such a retractor assembly may be used for other types of cable such as power, data and communication cables. Moreover, referring to FIG. 14, in at least some embodiments, intermediate connectors (not illustrated) may be provided on bracket 178 and cable 50 may terminate at the intermediate connectors. Here, separate cables would link the intermediate connectors to selector 84.

Furthermore, other weight types may be employed instead of the pulley/weight assemblies 68. For instance, a simple weight may be fastened to a portion of cable 50 to tend to pull the handsets 48 toward well 69.

Figure 21:
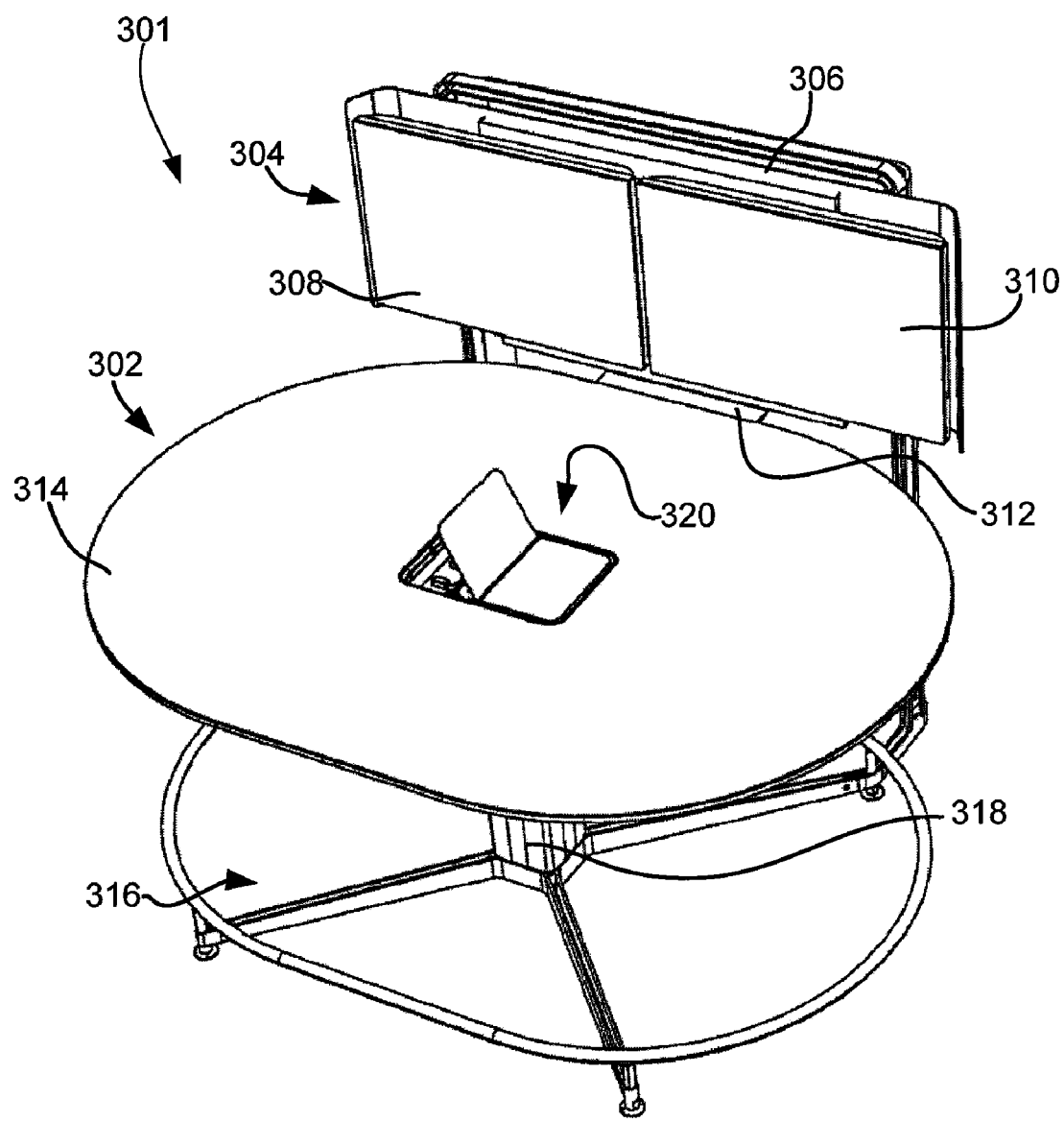
FIG. 21 is a perspective view of yet another table assembly that is consistent with at least some aspects of the present invention.
Figure 22:
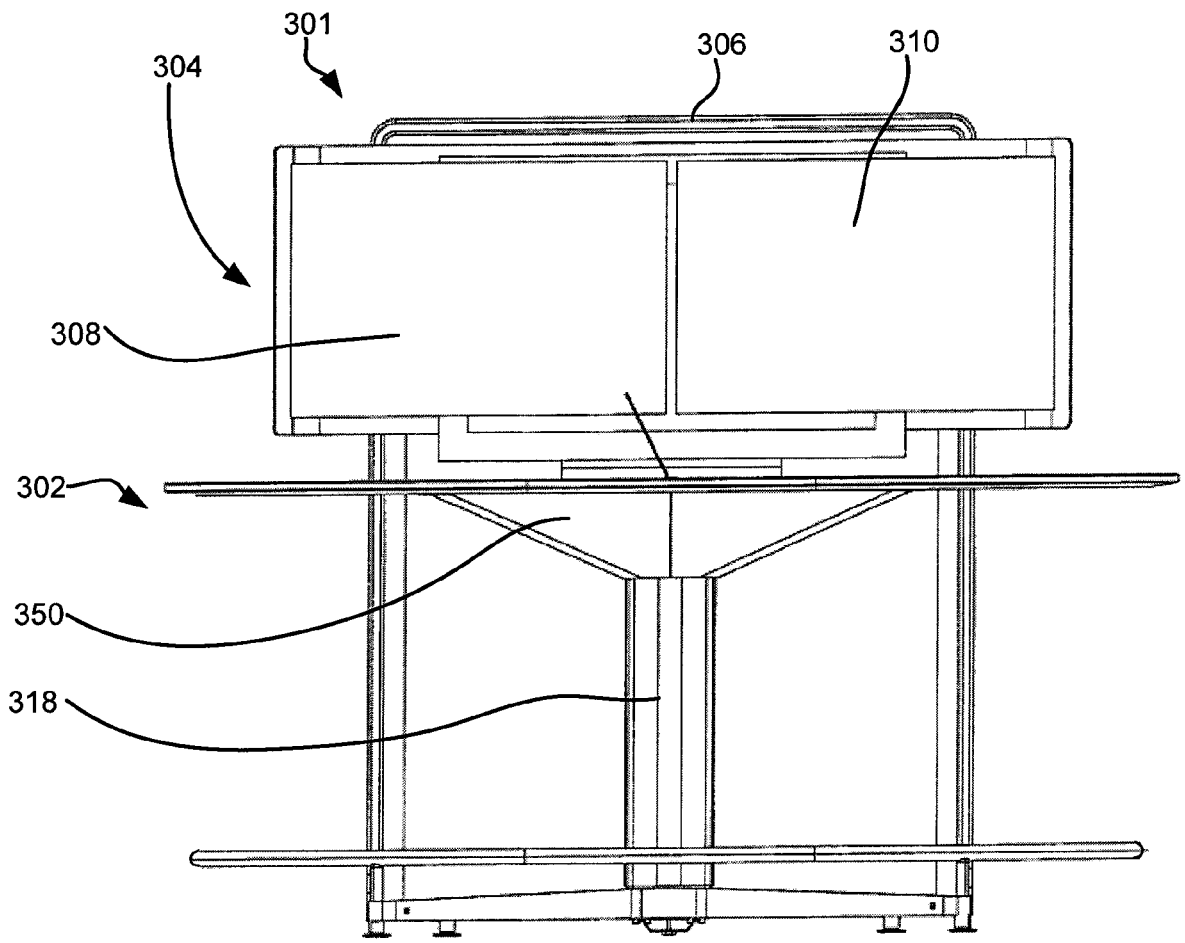
FIG. 22 is a front plan view of the assembly shown in FIG. 21.
Figure 23:
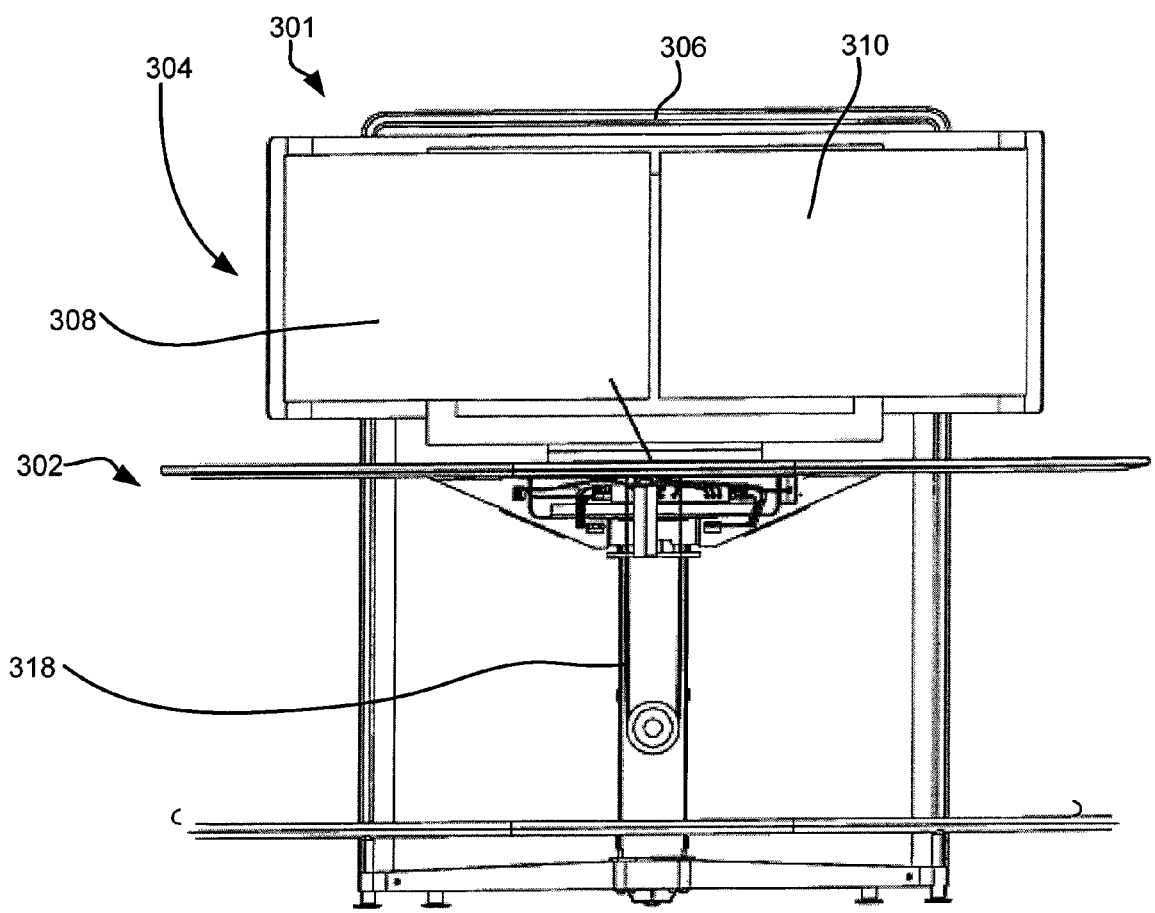
FIG. 23 is similar to FIG. 22, albeit showing the assembly with various housing components removed.
Figure 24:
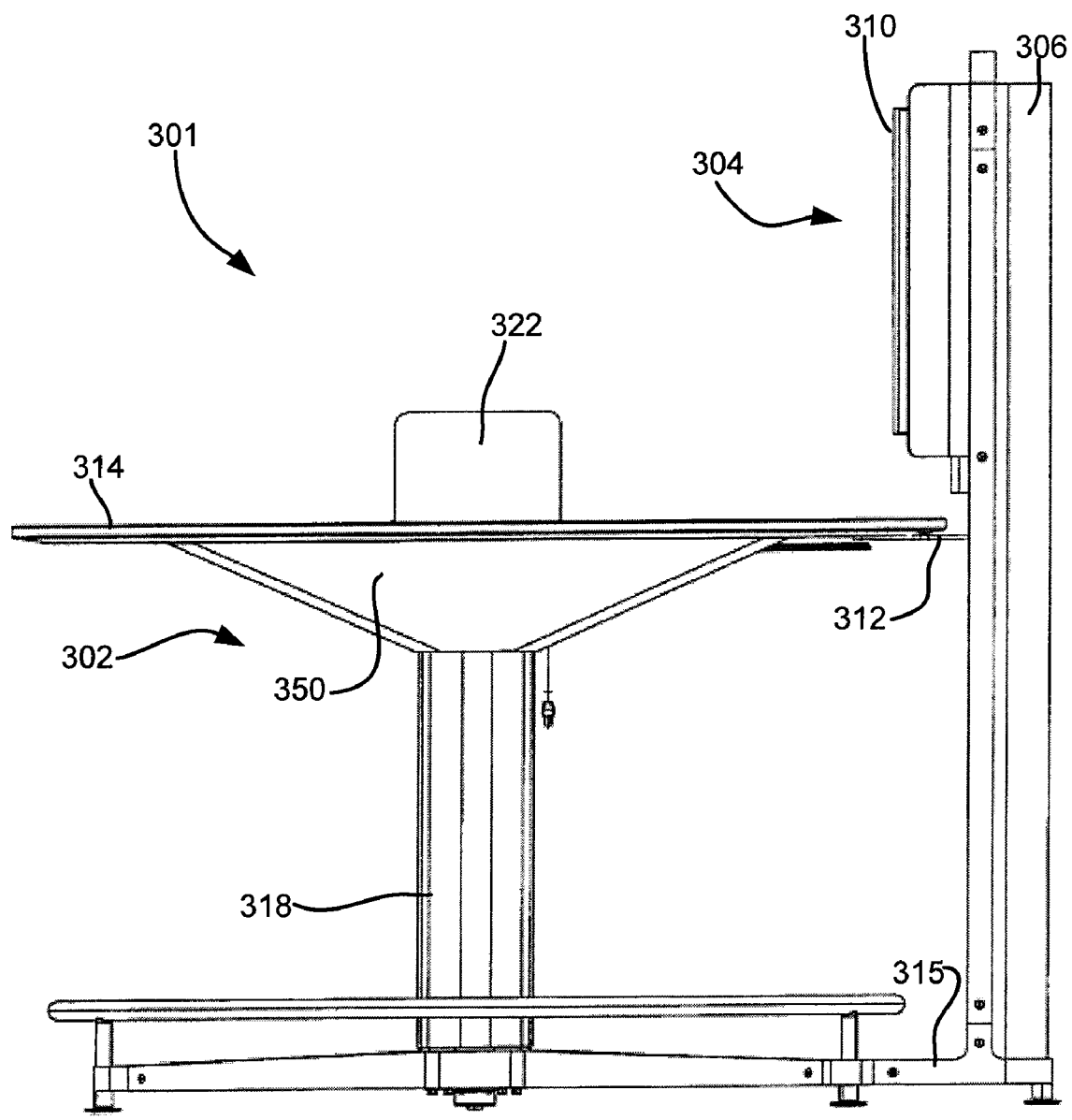
FIG. 24 is a side plan view of the assembly shown in FIG. 21.

Referring now to FIG. 21, yet one other exemplary conferencing table configuration or assembly 301 is illustrated that includes a table assembly 302, a totem/display assembly 304 and a bridge assembly 312. Table assembly 302 includes a leg support structure 316, a table top member 314 and a wire management assembly 320. Referring also to FIGS. 22 through 24, leg support structure 316 includes a vertical leg sub-assembly 318 and horizontal foot members and a rail member which are not separately labeled. Vertical leg sub-assembly 318 supports a central portion of table top member 314 at a top end thereof.

Referring to FIGS. 21 and 22, the wire management assembly 320 includes a housing structure 350 at the top end of sub-assembly 318 that, as the label implies, houses a sub-set of the components that comprise the wire management assembly 320. In FIG. 23, an outside cover of sub-assembly 318 has been removed as well as the housing structure 350 to show that portions of assembly 320 reside within the housing structure 350 as well as extend down into a channel formed by sub-assembly 318.

Referring once again to FIG. 21, table top member 314 forms a central opening for receiving a sub-set of the wire management assembly components as will be described in greater detail below. Referring to FIG. 24, bridge assembly 312 in this embodiment includes a simple bracket that secures an undersurface of table top member 314 to totem 304. Here, video and, in at least some case, audio cables, may pass from within housing 350 to totem 304 adjacent the bridge bracket 312 for linkage to display screens. In addition, power may be provided to the components within housing 350 via a cable running up through totem 306 and adjacent or under the bracket that forms bridge 312 into the housing 350. In still other cases, foot members 315 (only one of two shown) secure a bottom of totem 306 to foot structure that forms the understructure of table assembly 302. Here, in at least some embodiments, power and data cables may run through members 315 to components within housing 350.

Referring yet again to FIGS. 21 through 24, totem 304 includes a generally vertical structure 306 that supports first and second flat panel video display screens 308 and 310, respectively. Here, the two screens may enable separate table users to control content simultaneously, a different user controlling each one of display screens 308 and 310. In other embodiments, a large single display screen may be provided as described above with respect to other embodiments where the display screen may be split into two or more separate regions where the content in each of the regions can be controlled by a different one of a plurality of table users via a user unique handset.

Figure 25:
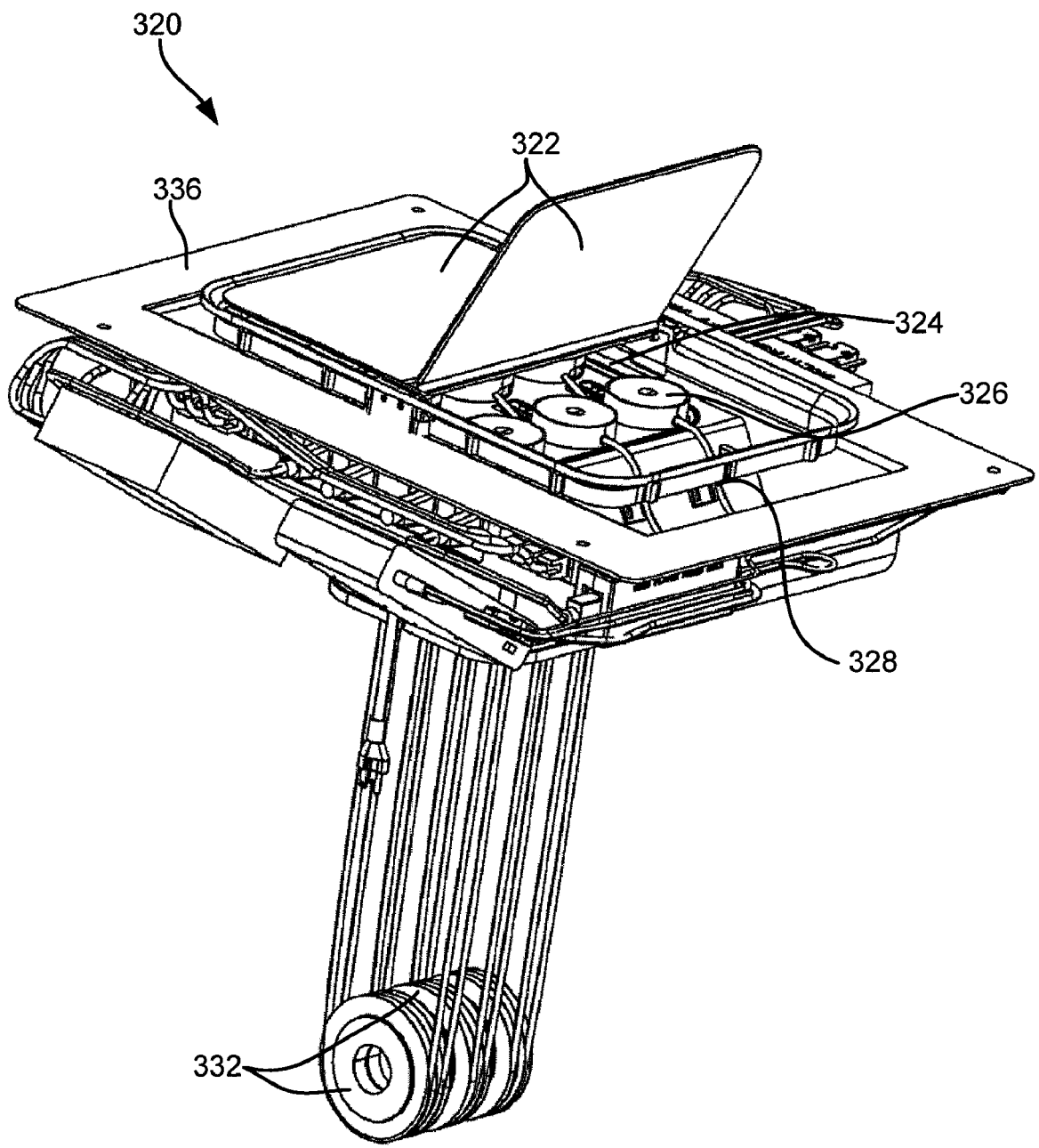
FIG. 25 is a perspective showing a wire management assembly that forms part of the assembly shown in FIG. 21.

Referring now to FIG. 25, an exemplary wire management assembly 320 is illustrated which includes a plurality of housing component as well as power and data cables, a power brick, an Ethernet switching component, a video player, a plurality of power and data receptacles, six handsets, one identified by numeral 326, and pulley-type weights, two of which are collectively identified by numeral 332. Assembly 320 is similar to assembly 52 described above with a few differences. With respect to differences between the assemblies, referring to FIGS. 25 through 28, it should be appreciated that a handset receiving housing 336 that mounts to an undersurface of the table top 314 (see again FIG. 21) below the central opening forms a recess 330 in which an island forming member 324 is centrally mounted (see specifically FIG. 26). Generally vertical or angled surfaces formed by member 336 and the island forming member 324 form power and data receptacle receiving openings 332 and 334, respectively. Here, a top surface of the island forming member 324 resides below an undersurface of top member 314 and forms a space between island forming member 324 and the plane formed by the table top member 314 in which the handsets 326 can generally reside. Thus, in this embodiment, the handsets are positioned relatively higher within the recess 330 than in the previous embodiment described above.

Figure 26:
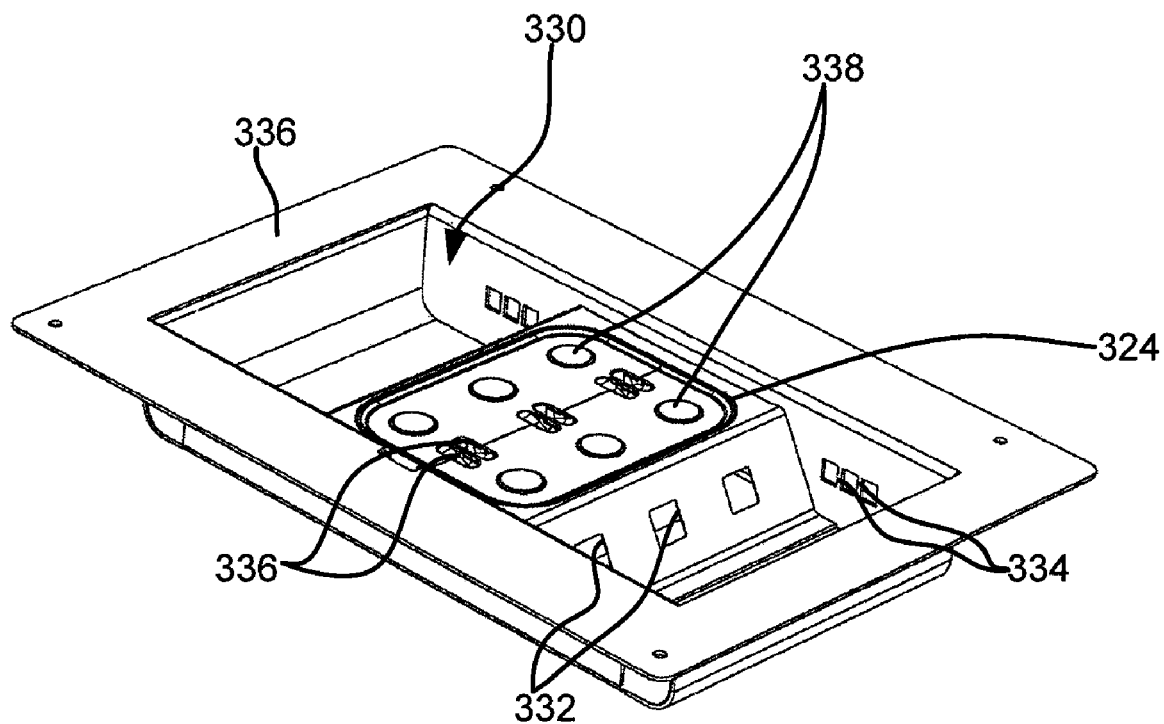
FIG. 26 is a perspective view showing a sub-set of the housing components shown in FIG. 25.
Figure 27:
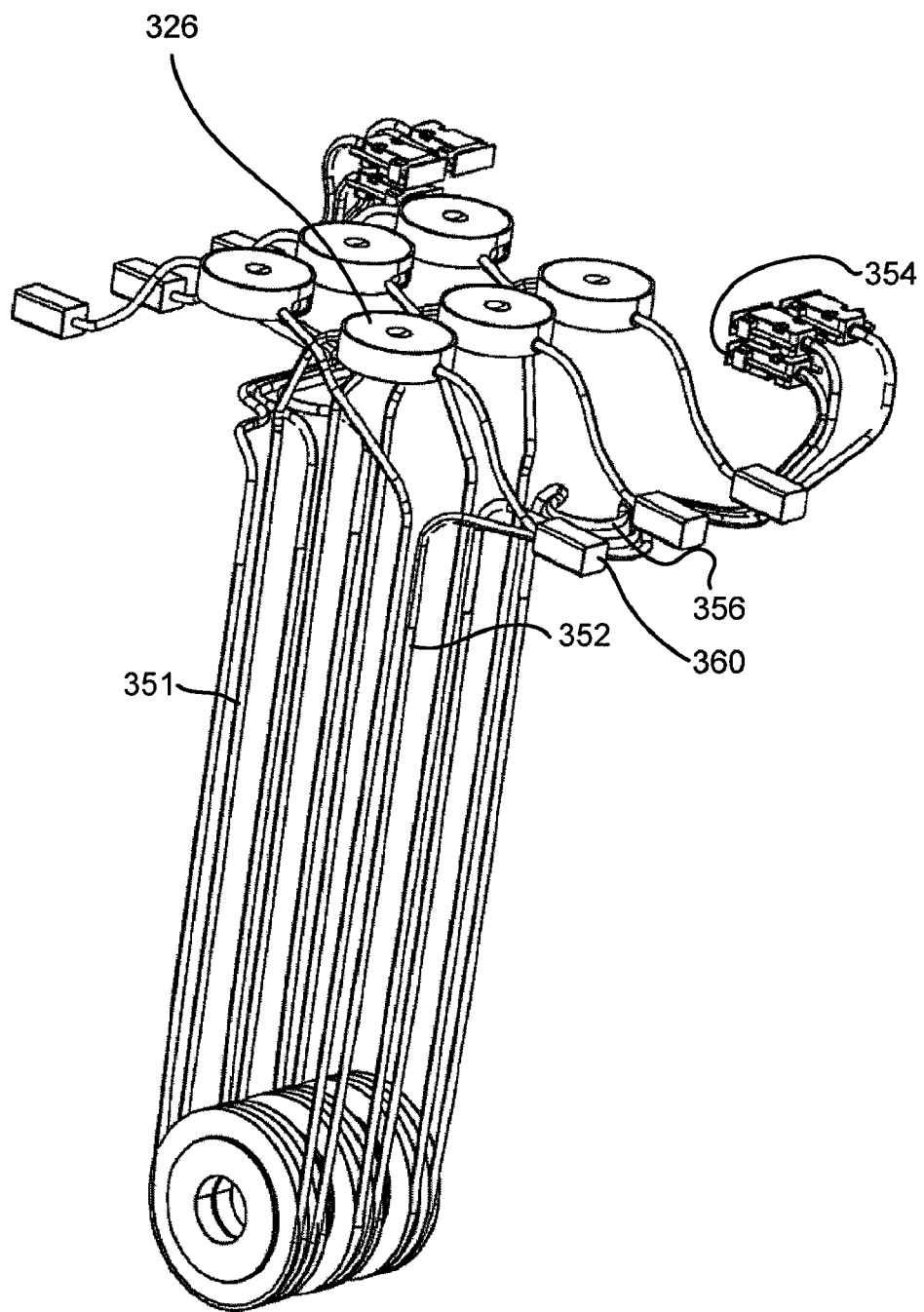
FIG. 27 is a perspective view showing handsets, associated cables and pulleys used to form part of the assembly shown in FIG. 25.

Referring now to FIG. 27, audio/video cable extension modules 360 are shown with a separate module 360 connected via a cable 369 to each one of the handsets 326. Thus, here, module 360 can be used to link to a computer used by a user and can thereby be readily associated with one of the handsets 326 linked thereto. Computers can be linked to the power and data outlets that reside in openings 332 and 334, respectively, as shown in FIG. 26. In other contemplated embodiments power, data, audio and video may be supported by each of modules 360.

Referring still to FIGS. 25 through 27 and also to FIG. 28, another difference between the embodiment shown in FIGS. 21 through 28 and the embodiments described above is that cables from the handsets 326 extend down through island forming member 324 (see again FIG. 26), wrap around an associated weight 332 and then extend back up toward the undersurface of member 336 so that the weight 332 associated with a handset resides below the handset when the handset is in the stored position. Here, see openings 336 formed in the top surface of island member 324 for passing handset cable. See specifically FIG. 28 where a cable 351 extends down from handset 326, wrap around an associated weight 332 and then extends back up as indicated at 351 to under the associated handset 326 and terminates at 354. This design results in a more compact wire management structure, operates better than the designs described above and locates the handsets 326 in a more easily accessible position.

Figure 28:
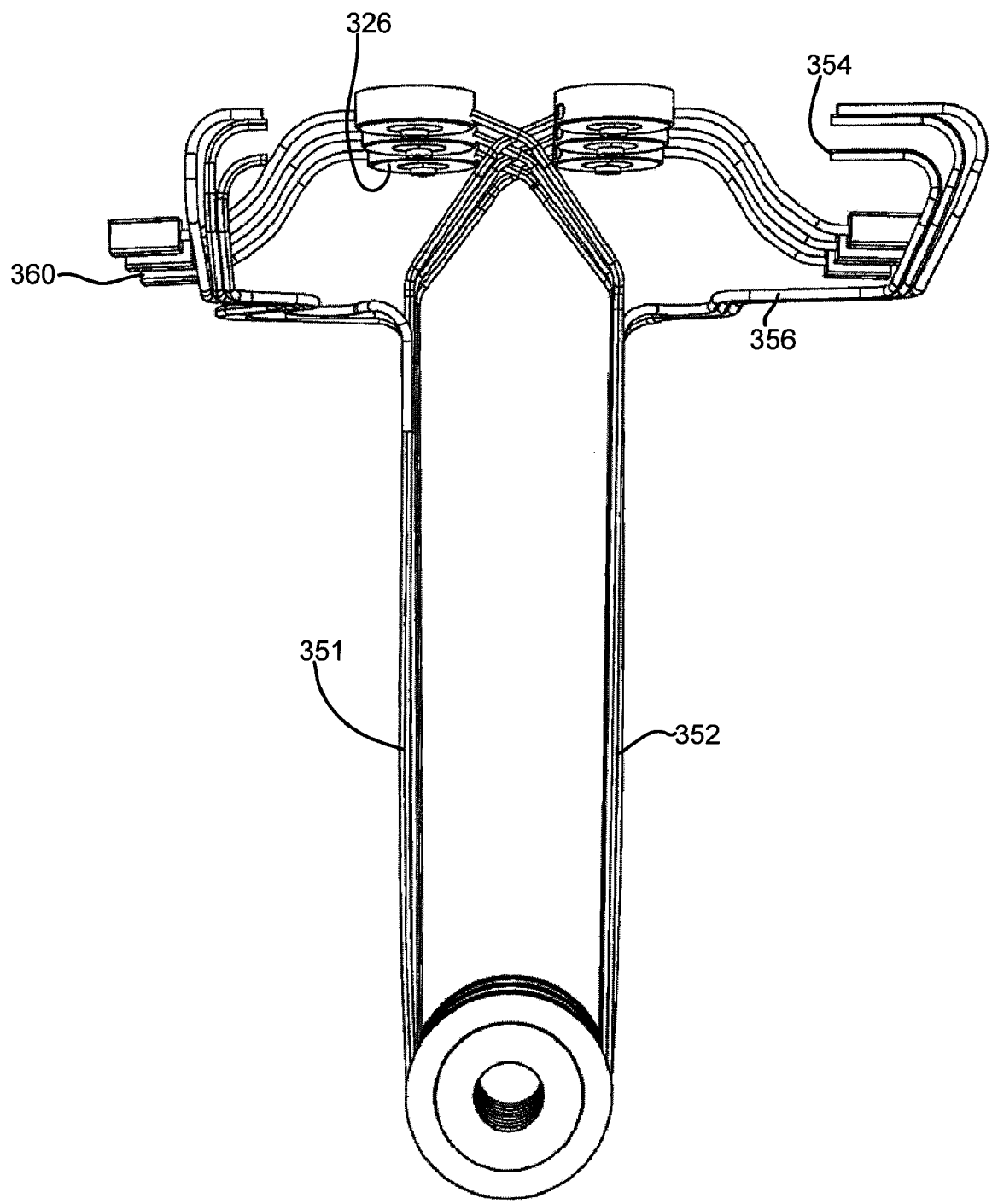
FIG. 28 is a front perspective view of the sub-assembly of FIG. 27, albeit without data jacks.

Referring now to FIGS. 26 and 28, in at least some embodiments of the present invention it is contemplated that the top surface of the island forming member 326 may be fitted with flat tacky plastic or magnetic members 338 where the handsets 326 have complementary flat surfaces 362 (see FIG. 28). Here, when a handset 326 is placed on one of members 338, the handset 326 will generally be captured thereby unless affirmatively removed by a table user. When a handset 326 is in the stored position as shown in FIGS. 25, 27 and 28, the power and data modules 360 reside within a lower portion of the recess 330 formed by housing 336. Thus, both the handset 326 and the power/data module are located in easily accessible storage positions when stowed. In still other embodiments parts 338 of the top surface of the island deck 324 may be raised or recessed and complimentary recesses or raised portions may be provided on the undersurfaces of the hand sets 326 so that when a handset 326 is placed on the deck, the raised portion and the recess cooperate to effectively hold the handset in the stored position unless affirmatively removed by a user.

Figure 29:
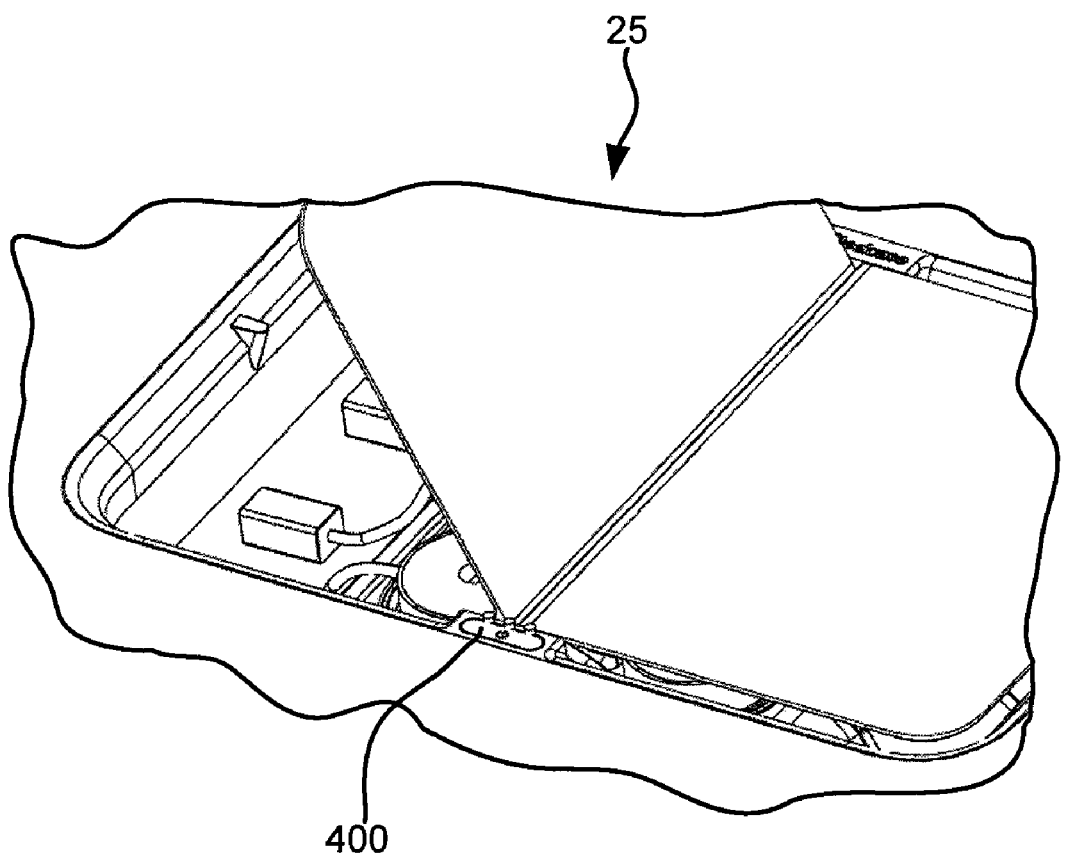
FIG. 29 is a perspective view of a wire management system including a single on/off button

In some embodiments a single on/off control button for the table system may be provided. To this end, referring to FIG. 29, a close up view of an on/off button 400 built into a rim of the wire management unit is shown. In at least some embodiments the button 400 may have a universal power icon thereon to indicate to potential users that the button is for powering up the system. In some embodiments the button will always be illuminated to indicate to users that the system is powered. In some embodiments the button will be illuminated via a white LED when the display screens are off and, once pressed to turn on the screens, will toggle to a green color. Thus, the entire system may be able to be turned on by pressing a single button 400. In some cases when button is pressed, a short animation (e.g., 15 seconds) may start on the display screen using universal graphics to guide a user to open the well, pull out and attach a handset to a computer and touch the handset to share information.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims.

To apprise the public of the scope of this invention, the following claims are made:

What is claimed is:

1. A conferencing assembly for use with at least one computer, the assembly comprising:
    a table top member having top and bottom surfaces and forming a table top opening;
    a leg support structure supporting the top member is a substantially horizontal orientation;
    a display screen supported adjacent the top surface;
    a switcher for controlling input to the display screen;
    a plurality of handsets, each handset including a selector button usable to send a signal to the switcher thereby causing the switcher to link a computer associated with the selector button to the display;
    a plurality of handset cables, each handset cable having first and second ends linked to the switcher and an associated selector button, respectively, for passing signals from the selector buttons to the switcher;
    a take up assembly including a separate weight for each of the handset cables, the take up assembly disposed below the top member and aligned with the table top opening, each handset cable linked to an associated weight, each weight applying a force tending to pull the second end of the associated handset cable into the opening.

2. The assembly of claim 1 wherein each weight includes a pulley wheel, each handset cable passing around an associated pulley wheel.

3. The assembly of claim 2 wherein each weight further includes first and second plates mounted on opposite sides of the pulley wheel.

4. The assembly of claim 3 wherein the plates are mounted to the pulley wheel axis via a pin.

5. The assembly of claim 2 wherein the take up assembly further includes a guide structure, the guide structure forming a separate substantially vertical channel for each of the pulley wheels, each pulley wheel moving up and down within a channel as the second end of an associated cable is pulled away from and allowed to move toward the opening, respectively.

6. The assembly of claim 2 wherein each handset cable further includes a video cable and each handset further includes a video jack proximate the button for linking to an associated computer.

7. The assembly of claim 6 wherein each handset cable further includes an audio cable and each handset further includes an audio jack proximate the button for linking to an associated computer.

8. The assembly of claim 1 including at least four separate handsets.

9. The assembly of claim 1 wherein the take up assembly further includes a deck member having a top deck surface below the top surface of the table top member, the deck member forming a separate opening for each of the handsets, each cable passing through a separate one of the openings formed by the deck member, the handsets received on the deck surface of the deck member thereby limiting downward movement through the opening formed by the deck member.

10. The assembly of claim 9 wherein the deck surface forms a recess proximate each of the openings formed by the deck member, each recess formed to receive an associated one of the handsets.

11. The assembly of claim 9 wherein the deck surface is substantially parallel to the top surface of the table top member.

12. The assembly of claim 9 further including at least one utility wall member extending upward from the deck surface below the table top member and at least one of a power and a data receptacle mounted in the wall member for access through the table top opening.

13. The assembly of claim 12 further including a utility island extending upward from the deck surface, the utility wall forming a circumferential wall about the island, the island further including a top mounting surface that is substantially parallel to the top surface of the table top member.

14. The assembly of claim 13 wherein the island includes at least first, second, third and fourth receptacles, the first and second receptacles facing in substantially opposite directions and the third and fourth receptacles facing in substantially opposite directions.

15. The assembly of claim 13 further including first and second door members hingedly mounted to the top mounting surface for movement between open and closed positions, each door member including a top door surface, when the door members are in the closed positions, the door members substantially closing the table top opening and the door surfaces substantially flush with the top surface of the table top member.

16. The assembly of claim 15 wherein an opening edge defines the shape of the table top opening, the door members forming a gap with the opening edge when in the closed positions.

17. The assembly of claim 9 wherein the deck member has a circumferential edge, the assembly further including a well wall member extending upward from the circumferential edge of the deck member to the bottom of the table top member so that the deck and the well wall member form a cavity below the table top member for receiving cables and the like.

18. The assembly of claim 1 wherein each handset weighs at least one pound.

19. A conferencing assembly for use with at least one computer, the assembly comprising:
a table top member having top and bottom surfaces and forming a table top opening;
a leg support structure supporting the top member is a substantially horizontal orientation;
a display screen and supported adjacent the top surface;
a switcher for controlling input to the display screen;
a plurality of handsets, each handset including a selector button usable to send a signal to the switcher thereby causing the switcher to link a computer associated with the selector button to the display;
a plurality of handset cables, each handset cable having first and second ends linked to the switcher and an associated selector button, respectively, for passing signals from the selector buttons to the switcher;
a deck member having a top deck surface below the top surface of the table top member and aligned with the table top opening, the deck member forming a separate opening for each of the handsets, each handset cable passing through a separate one of the openings formed by the deck member, the handsets received on and supported by the deck surface of the deck member when in a stored position; and
a take up assembly including a separate pulley wheel for each of the handset cables, the take up assembly disposed below the deck member, each handset cable linked to an associated pulley wheel, each pulley wheel applying a force tending to pull the second end of the associated handset cable toward the deck top.

20. The assembly of claim 19 wherein the leg support structure form a leg cavity, the deck member and take up assembly disposed within the leg cavity.

21. The assembly of claim 20 wherein the switcher is also disposed within the leg cavity.

22. The assembly of claim 20 further including a totem assembly and a bridge member, the totem assembly having top and bottom ends and a mounting surface, the totem disposed adjacent the top member with the mounting surface above the top surface of the table top member, the bridge member having first and second ends secured to the leg support structure and the totem assembly, respectively, the display screen mounted to the mounting surface adjacent the top surface of the table top member.

23. A conferencing assembly for use with at least one computer, the assembly comprising:
a table top member having top and bottom surfaces and forming a table top opening;
a leg support structure supporting the top member is a substantially horizontal orientation;
a display screen associated with the top member and supported adjacent the top surface;
a switcher for controlling input to the display screen;
a plurality of handsets, each handset including a selector button usable to send a signal to the switcher thereby causing the switcher to link a computer associated with the selector button to the display;
a plurality of handset cables, each handset cable having first and second ends linked to the switcher and an associated selector button, respectively, for passing signals from the selector buttons to the switcher; and
a deck member having a top deck surface below the top surface of the table top member and aligned with the table top opening, the deck member forming a separate opening for each of the handsets, each handset cable passing through a separate one of the openings formed by the deck member, the handsets received on and supported by the deck surface of the deck member when in a stored position.

24. The assembly of claim 23 further including a take up assembly including a separate weight for each of the handset cables, the take up assembly disposed below the deck member, each handset cable linked to an associated weight, each weight applying a force tending to pull the second end of the associated handset cable toward the deck top.

* * * * *